(12) United States Patent
Van Treuren et al.

(10) Patent No.: US 11,873,075 B2
(45) Date of Patent: Jan. 16, 2024

(54) PROPELLER WITH UNLOADED TIP ZONE AND METHOD

(71) Applicants: Athule Aero Technologies, Inc., Waco, TX (US); WISNIEWSKI ENTERPRISES, Monument, CO (US)

(72) Inventors: Kenneth W. Van Treuren, Waco, TX (US); Charles F. Wisniewski, Monument, CO (US)

(73) Assignee: ATHULE AERO TECHNOLOGIES, INC., Waco, TX (US)

( * ) Notice: Subject to any disclaimer, the term of this patent is extended or adjusted under 35 U.S.C. 154(b) by 0 days.

(21) Appl. No.: 17/700,019

(22) Filed: Mar. 21, 2022

(65) Prior Publication Data
US 2022/0297820 A1 Sep. 22, 2022

Related U.S. Application Data
(60) Provisional application No. 63/164,439, filed on Mar. 22, 2021.

(51) Int. Cl.
*B64C 11/18* (2006.01)
(52) U.S. Cl.
CPC ................ *B64C 11/18* (2013.01)
(58) Field of Classification Search
CPC ....... B64C 11/18; F01D 5/141; F03D 1/0633; F03D 1/0641
See application file for complete search history.

(56) References Cited

U.S. PATENT DOCUMENTS

| 3,144,999 A | 8/1964 | Rogallo |
| 3,173,490 A * | 3/1965 | Stuart, III ........... B64C 29/0091 |
| | | 416/223 R |

(Continued)

FOREIGN PATENT DOCUMENTS

GB 459096 A 1/1937

OTHER PUBLICATIONS

Aktas, B., Yilmaz, N., Atlar, M., Sasaki, N., Fitzsimmons, P., and Taylor, D., "Suppression of Tip Vortex Cavitation noise using PressurePores technology: A numerical and experimental investigation," Sixth International Symposium on Marine Propulsors (May 2019).

(Continued)

*Primary Examiner* — Courtney D Heinle
*Assistant Examiner* — Sang K Kim
(74) *Attorney, Agent, or Firm* — NEO IP

(57) ABSTRACT

The present disclosure provides a rotating propeller design that maintains a high efficiency and reduces noise. The design provides an unloaded tip zone of positive lift starting prior to an end of the tip with negligible, if any, positive lift that is counterintuitive to the purpose of a propeller. The unloaded tip zone decreases the strength of a tip vortex and reduces induced drag. The result is a significant reduction in noise while maintaining substantially high mechanical efficiency, even with an optional increase in RPM to compensate for the reduced lift without requiring a longer propeller. At least one propeller design can break the beta angle from the propeller hub with a different beta angle at a first location from the hub and then also break the beta angle at a second location further from the hub into the unloaded tip zone to form a double break propeller.

4 Claims, 25 Drawing Sheets

(56) References Cited

U.S. PATENT DOCUMENTS

| | | | | |
|---|---|---|---|---|
| 4,790,724 A * | 12/1988 | Bousquet | ................ | B64C 11/18 |
| | | | | 416/243 |
| 10,415,581 B1 * | 9/2019 | Seeley | .................. | F04D 29/384 |
| 11,333,160 B2 * | 5/2022 | Seeley | .................. | F04D 29/668 |

OTHER PUBLICATIONS

Bennett, B.D., Van Treuren, K.W., "Creation of a Novel Tool for the Design and Evaluation of UAS Propellers," American Society for Engineering Education (ASEE) (2021).

Bowers, A.H., Murillo, O.J., Eslinger, B., and Gelzer, C., 2016, "On Wings of the Minimum Induced Drag: Spanload Implications for Aircraft and Birds," NASA/TP-2016-219072.

M. Drela, "QPROP Formulation." MIT Aero & Astro, Jun. 2006, Accessed: Sep. 14, 2020, http://web.mit.edu/drela/Public/web/qprop/qprop_theory.pdf.

R.D. Sanchez, "Aerodynamic and Aeroacoustic Design of Small Unmanned Aircraft System Propellers at Low Reynolds Numbers," Master's Thesis, Baylor University, Waco, Baylor, 2020.

Van Treuren, K.W., and Wisniewski, C., 2019, "Testing Propeller Tip Modifications to Reduce Acoustic Noise Generation on a Quadcopter Propeller," Journal for Engineering for Gas Turbines and Power, vol. 141, pp. 121017-1 to 1210117-11.

W.R. Liller III, "The Design of Small Propellers Operating at Low Reynolds Numbers and Associated Experimental Evaluation," Master's Thesis, Baylor University, Waco, Texas, 2015.

* cited by examiner

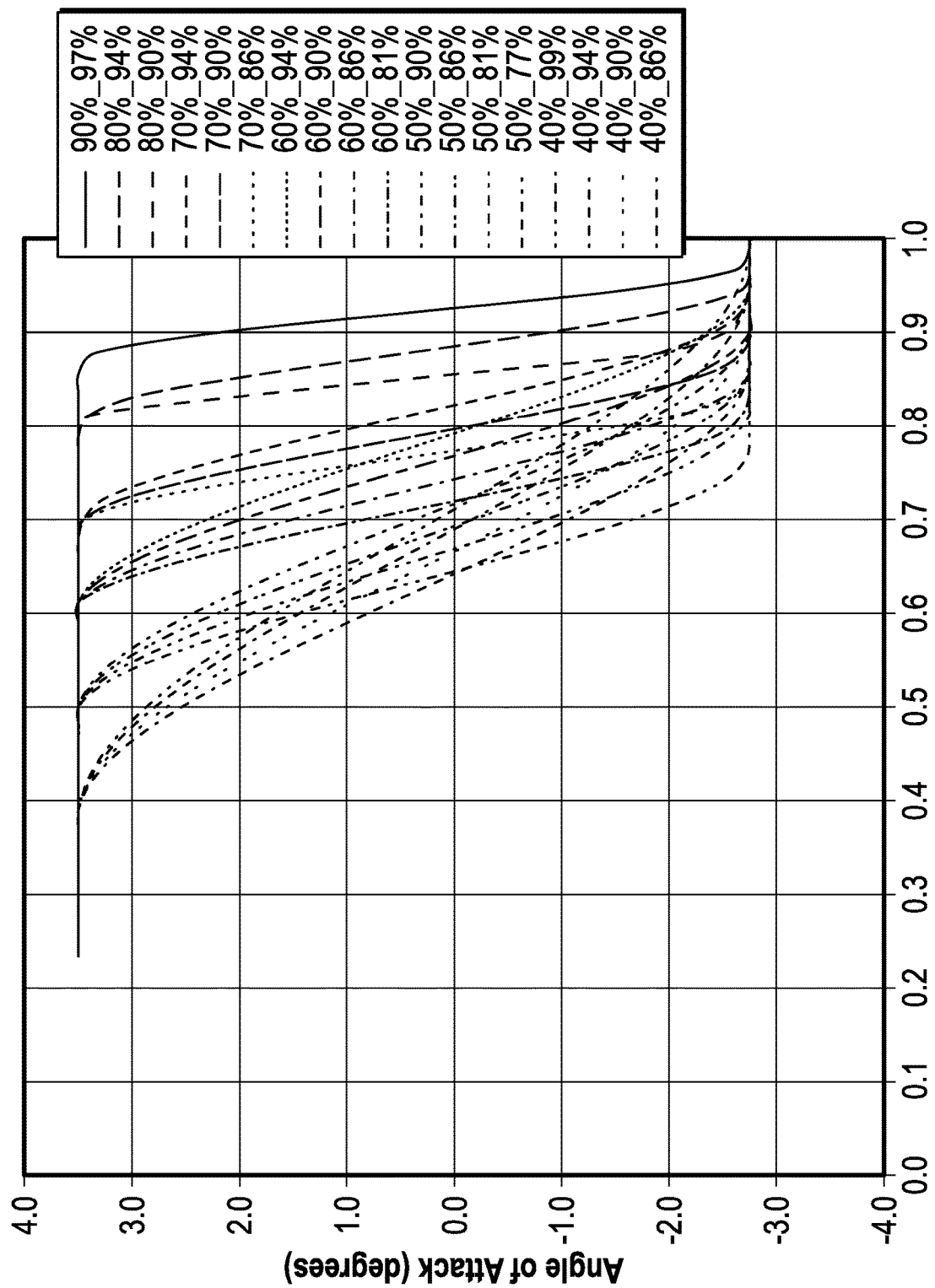

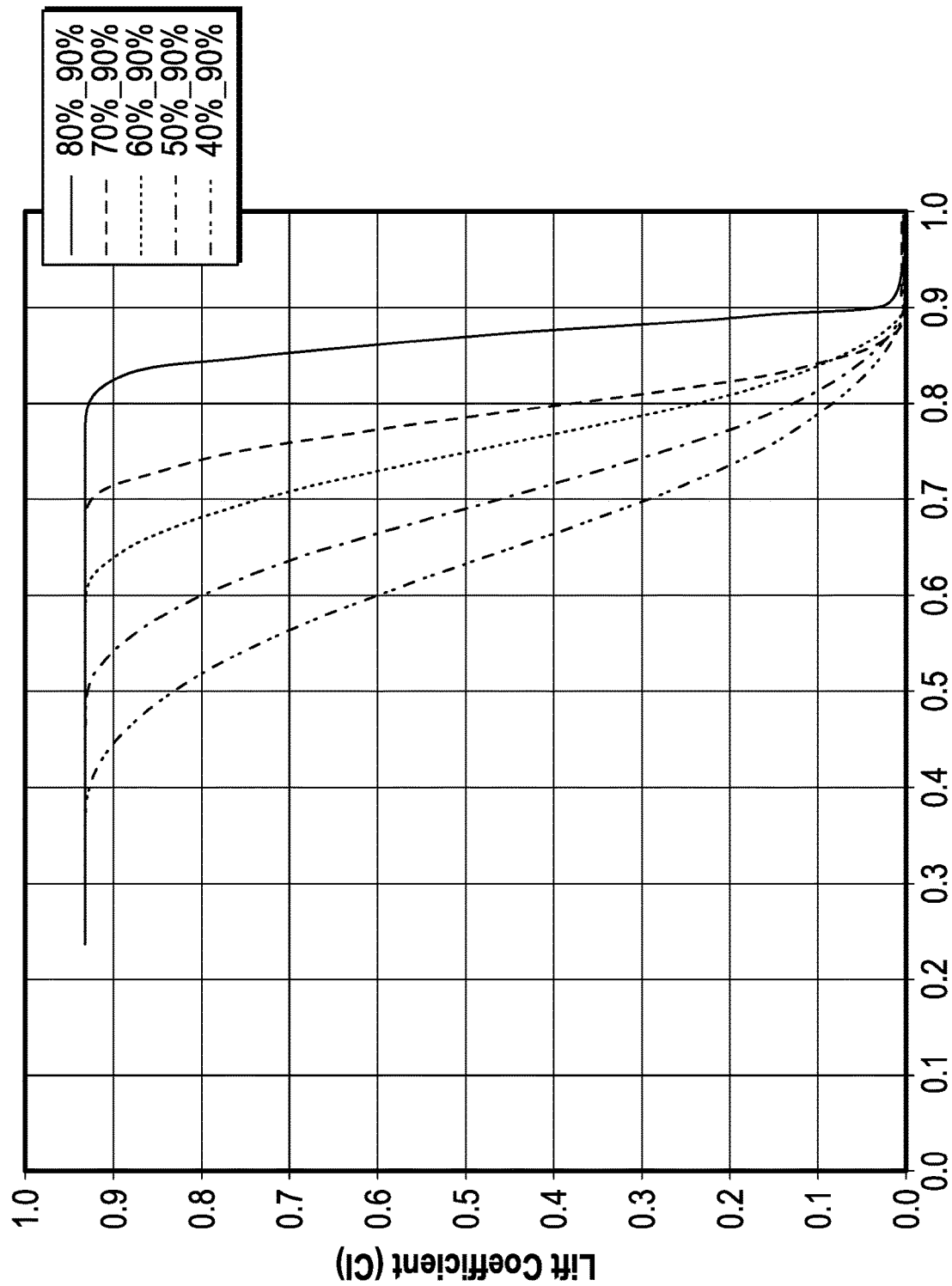

PROPELLER WITH UNLOADED TIP ZONE AND METHOD

CROSS REFERENCE TO RELATED APPLICATIONS

This application claims the benefit of U.S. Provisional Application No. 63/164,439, filed Mar. 22, 2021, entitled "Propeller with Unloaded Tip Zone", which is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to a propeller with low noise and high efficiency. More specifically, the disclosure relates to a propeller designed with a blade curvature that converges into a tip zone prior to the tip that is unloaded, that is, produces negligible lift.

Description of the Related Art

Unmanned Aircraft Systems (UASs) are continuing to rise in use across the globe. In addition, there is a renewed interest in eVTOL aircraft with over 300 vehicles using some form of electric lift propulsion. Both make extensive use of propeller technology coupled with an electric battery/motor system. Applications of eVTOL are to be found in both the commercial and military sectors. If these vehicles are to co-exist with the general population in an urban setting, the sound level of the drone should be addressed and reduced to an acceptable level. If UASs can be made quieter and more efficient, they will have an even bigger impact on society. Reducing the mechanical power required to operate the UAS, while at the same time lowering the sound being generated by the propeller, is the challenge.

Most propeller design programs use the classic Blade Element Momentum Theory ("BEMT"). Propellers designed using the traditional BEMT approach set the $c_l$ corresponding to the angle of attack associated with maximum $c_l/c_d$ over the entire span of the propeller and adjust the radial ("beta" or $\beta$, herein) angle to satisfy this constraint. This results in a propeller designed for minimum induced losses in which the tip of the propeller blade generates most of the lift and thrust. These highly loaded tip conditions generate strong coherent vortices that are the primary flow.

FIG. 1A is schematic perspective prior art diagram of a propeller with a partial cross sectional view of a propeller blade illustrating variables used in Blade Element Momentum Theory ("BEMT") geometry. FIG. 1B is a schematic cross sectional diagram of the propeller blade of FIG. 1A illustrating additional BEMT variables and their meaning. FIG. 1C is a vector schematic prior art diagram illustrating tangential induced velocity components along the blade due to its rotation about a hub.

In designing and evaluating propeller blades 4, a propeller 2 having chord length c as a maximum width can be divided into cross-sectional segments 14 from the hub 6 to the tip 8 of the propeller blade at a given radius r from a center of rotation with the length of the blade from the center of rotation being R. By definition, the maximum ratio of r/R is 1.0. The rotational speed of each segment 14 is $2\Pi nr$, where n is the propeller rotational velocity in cycles per second and varies directly proportional to the distance r, where a segment near the hub is much slower in speed that a segment near the tip for the same revolutions per second. Each of these segments is made up of an airfoil operating at a set geometry. At each subsection, the airfoil will be producing lift and drag based on the angle of attack ($\alpha$ or AOA, herein) at which it is operating relative to the angle of the relative wind as the propeller moves with a forward velocity V, such as with an airplane. The relative wind is referenced to the blade rotational plane and this angle is known as the helix angle $\phi$. The helix angle is the angle of the relative velocity seen by the propeller because of the axial and rotational velocities. The relative velocity at each subsection needs to be calculated as the lift and drag production is affected by the relative velocity. Then, the angle of attack at which the airfoil is operating for each subsection can be determined by subtracting the helix angle from the beta angle. Further, calculations and performance evaluations include a tangential velocity $V_i$ of wind induced along the length of the propeller blade as it rotates. The tangential velocity $V_i$ can be characterized into vector components, such as with a cosine of helix angle $\phi$ of the rotating propeller. The lift and drag forces acting on the segment are dL and dD, respectively. The variable dL acts perpendicular to the vectorial sum of V and $2\Pi nr$, while dD acts along but opposite to that vector sum. The force dT is the actual propeller thrust of the blade element. The force perpendicular to dT is the force which produces the propeller torque, Q (such as in ft-lbs) and is labeled dQ/r.

Publicly available programs for propeller design break the propeller down into segments as described in FIGS. 1A-1C and analyzes the aerodynamic performance of each segment based on airfoil data. Each section then contributes to the overall design performance of the propeller. Also, part of the BEMT design process is the minimization of the induced loses. These loses occur because of the induced velocity into the propeller caused by propeller rotation.

The design angle of attack for each propeller section is typically the angle of attack for the maximum coefficient of lift/coefficient of drag ($c_l/c_d$) ratio, minimizing drag while maximizing lift. Holding this angle constant results in the majority of the thrust produced by the propeller being generated in the outer sections of the blade due to the high rotational/relative velocity to the blade section. The purpose of BEMT is then to minimize the axial and tangential induction factors to minimize these losses. The tangential induction factors are dependent on the velocity of the blade section as it rotates. Because the velocity increases as the distance from the hub increases, the propeller design is challenged to model a lift distribution due to the increasing velocity with increasing distance from the hub. By contrast, a fixed wing ideally has no tangential induction factors because it does not rotate.

On a fixed wing of an aircraft, the typical lift distribution follows Prandtl's lifting line theory explained in Prandtl L (1921) Applications of modern hydrodynamics to aeronautics, NACA Report No 116 (Washington, DC) 2, published in 1921, which results in an elliptical lift distribution. The result is an optimum spanload for minimum induced drag, which appeared to result in the greatest efficiency for given span. Lifting line theory has become the standard design tool for aircraft wings. While the concept is illustrative of design concepts, a propeller does not have an elliptical lift distribution like an aircraft wing. However, a propeller does have to deal with the tip vortex and the induced drag that is produced. Attempts have been made to reduce tip vortices of propellers using tip tapers, sweeps, and tip notches, and other modifications.

In 1933, Prandtl published another paper (Prandtl L (1933) Über tragflügel kleinsten induzierten widerstandes. Zeitschrift für Flugtecknik und Motorluftschiffahrt, 1 VI 1933 (München, Deustchland)), suggesting that the elliptical distribution was not the best solution for lift distribution on an aircraft fixed wing. He found a superior spanload solution that resulted in maximum efficiency for a given structure. Recently, some interest has occurred in alternative lift distributions for fixed wings. Bowers reported that for a fixed wing, the Prandtl distribution results in a wing that is 11% more efficient than the elliptical distribution, but requires a 22% greater span when compared to a similar elliptically loaded span. Bowers, A. H., Murillo, O. J., Eslinger, B., Technology, J., and Gelzer, C., 2016, "On Wings of the Minimum Induced Drag: Spanload Implications for Aircraft and Birds," NASA/TP-2016-219072 used this theory to describe how birds flew and maneuvered without using a vertical tail and sought to apply the concept to an aircraft fixed wing whether the aircraft could avoid a vertical tail. It adequately described induced drag and adverse and proverse yaw on a fixed wing, as can be seen when birds fly. Effectively, the Prandtl curve unloads at the wing tip and reduces or eliminates the tip vortex, which reduces induced drag found at the tip of the wing. Bowers, et al developed a subscale aircraft fixed flying wing and demonstrated how this theory could be applied to an actual aircraft. The results validated that the Prandtl curve more accurately describes the manner in which birds fly and maneuver. The Prandtl lift distribution as an alternative to the elliptical lift profile cannot be practically achieved on a propeller due to the increasing tangential induced velocity along the span of the rotating blade from the hub. However, the concept is illustrative of a difference from the standard BEMT approach, which holds the lift coefficient constant out to the tip in an effort to generate more lift.

Reducing the tip vortex is highly desirable on a rotating propeller. What is needed is a rotating propeller design that allows high efficiency but low noise that considers the tip vortex.

BRIEF SUMMARY OF THE INVENTION

The present disclosure provides a rotating propeller design that maintains a high mechanical efficiency and reduces noise. A classic propeller design has a beta angle that is adjusted in the radial direction to maintain a constant angle of attack over the span of the blade for maximum lift to drag ratio. In contrast, the propeller design of the invention provides an unloaded tip zone starting prior to an end of the tip with negligible, if any, positive lift that is counterintuitive to the purpose of a propeller. The unloaded tip zone results in a significant reduction in noise while maintaining substantially high efficiency. This result occurs even with an increase in RPM to compensate for the reduced lift without requiring a longer propeller. The propeller design tapers a beta angle near the tip to lower the angle of attack so that the lift coefficient near the tip goes to zero or less. In at least some embodiments, the beta angle of the invention departs from the standard beta angle at a first location along a span length from the propeller hub and then smoothly slopes with further adjustment of the beta angle into the unloaded tip zone to form a double break propeller. Unloading the tip zone of positive lift from the blade decreases the strength of a tip vortex and reduces the induced drag resulting in a lower noise signature and higher overall efficiency.

While traditional propeller design uses Blade Element Momentum Theory (BEMT), which minimizes induced losses, the invention uses an approach on the propeller design to minimize the induced drag of the propeller. This minimizing is accomplished by reducing the thrust loading of the propeller tip as counterintuitive to the normal BEMT accepted design criteria. This reduces the strength of the tip vortex significantly lowering the induced drag and the torque required to spin the propeller. Designing for minimum induced drag results in the propeller being more aerodynamically efficient. The lower tip vortex strength also lowers a near field Sound Pressure Level (SPL).

The disclosure provides a rotatable propeller configured to generate axial thrust having at least one blade coupled with a hub, the blade having a blade length from a center of the propeller to a blade tip at a distal end of the blade from the hub, wherein the propeller blade is formed with a beta angle that reduces in value toward the blade tip to lower an angle of attack so that a lift coefficient prior to the tip becomes zero or less.

The disclosure also provides a rotatable propeller blade configured to generate axial thrust and having a tip from an axis of rotation at a distal end of the blade and configured to generate substantially zero or less lift in an unloaded tip zone prior to an end of the tip.

The disclosure further provides a rotatable propeller blade configured to be coupled to a hub of a propeller, the blade configured to generate an axial thrust and that changes a beta angle from closer to the hub toward a smaller beta angle closer to the tip and creates an unloaded tip zone with substantially zero lift starting prior to an end of the tip.

The disclosure provides a propeller blade configured to be coupled to a hub of a propeller, the blade having a blade length from a center of the hub to a blade tip at a distal end of the blade from the hub, comprising: a loaded zone configured to produce lift; and an unloaded tip zone having a nonzero length of at least 3% of the blade length and configured to produce a substantially zero or less lift coefficient for the unloaded tip zone.

This disclosure also provides a method of reducing vortex flow generated by a propeller, the propeller having a blade with a tip coupled to a hub, comprising: creating positive lift in a loaded zone of the blade proximal to the hub; and avoiding creating positive lift in an unloaded tip zone of the blade having a nonzero length proximal to the tip.

BRIEF DESCRIPTION OF THE SEVERAL VIEWS OF THE DRAWINGS

FIG. 9A is an illustrative graph showing the test matrix of double break configurations tested.

FIG. 9B is an illustrative graph showing the $c_l$ for a sampling of the double break designs from FIG. 9A.

DETAILED DESCRIPTION

Figure 1A:
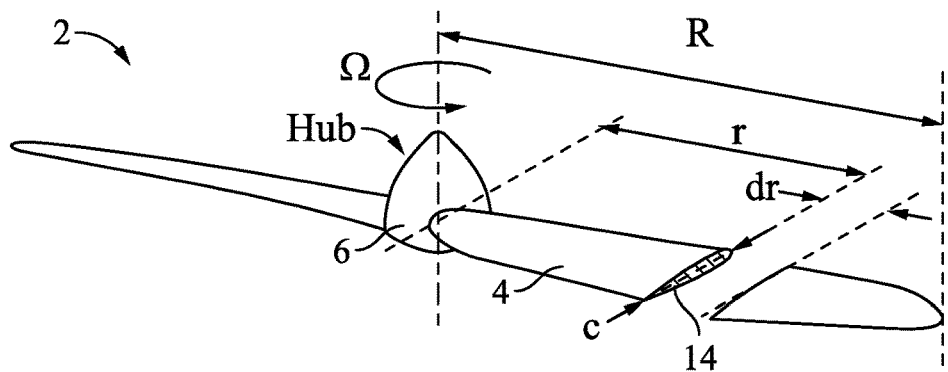
FIG. 1A is schematic perspective prior art diagram of a propeller with a partial cross sectional view of a propeller blade illustrating variables used in Blade Element Momentum Theory ("BEMT") geometry.
Figure 1B:
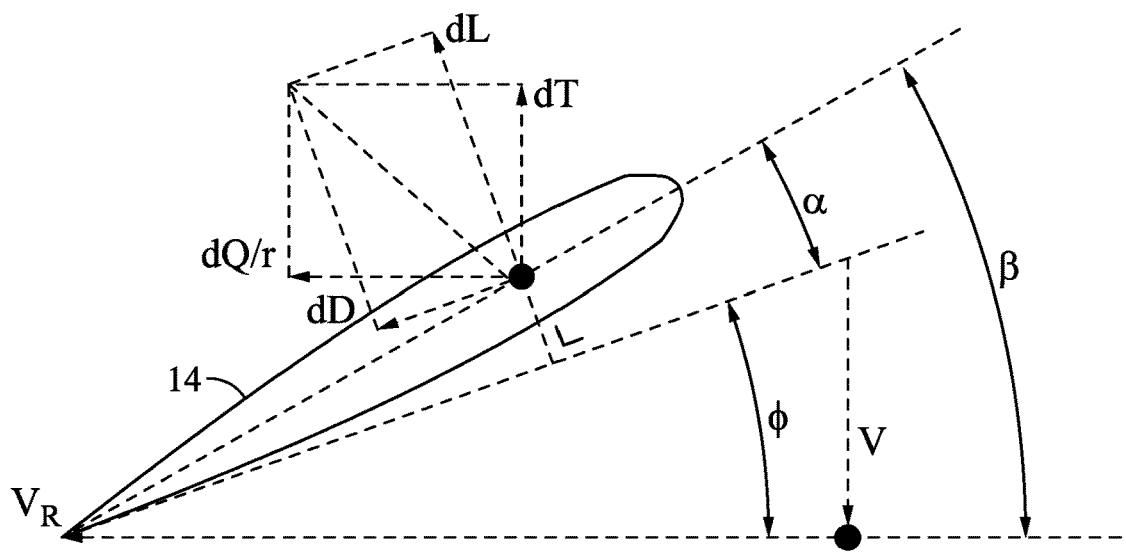
FIG. 1B is a schematic cross sectional diagram of the propeller blade of FIG. 1A illustrating additional BEMT variables and their meaning.
Figure 1C:
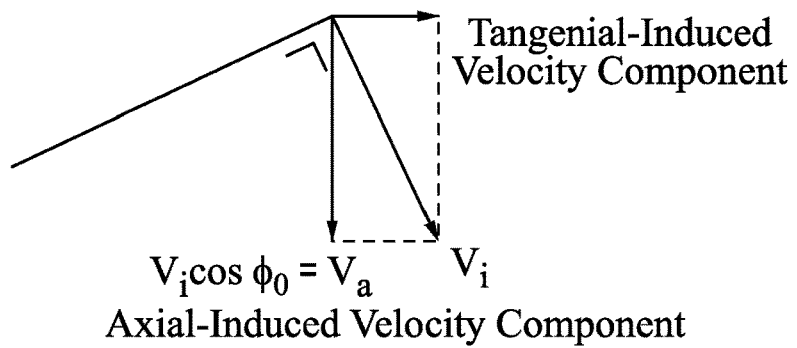
FIG. 1C is a vector schematic prior art diagram illustrating tangential induced velocity components along the blade due to its rotation about a hub.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally. The device or system may be used in a number of directions and orientations. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section, such as a controller would encompass a processor and a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. Expressions of percentage ranges and other ranges are inclusive, unless stated otherwise, and increments of the range can increase and decrease by integer numbers or fractions, so that for example a range of 0 to 10 includes 0 and 10 and any and all integers therebetween (e.g. 1, 2, 3 . . . ) and any and all fractions between each integer (e.g. 0.1, 0.2, 0.3, . . . and 0.01, 0.02, 0.03, . . . , and so forth). As used herein, "mechanical power" (or "power required" herein) means input power to the motor or engine for the propeller. "Aerodynamic power" means thrust multiplied by free stream velocity. "Mechanical power" means torque multiplied by the revolutions per minute RPM (or revolutions per other time period). "Mechanical efficiency" (or just "efficiency" herein) means the aerodynamic power divided by the mechanic power. The application refers to "zero" for a lift coefficient, lift, and slope, where the term "zero" is not an absolute mathematical value but is substantially zero and can vary with some deviation from such value so as to have minimal practical impact on the performance of the propeller blade as if the value was mathematical, as would be understood to those with ordinary skill in the art.

The present disclosure provides a rotating propeller design that maintains a high efficiency and reduces noise. A classic propeller design has a beta angle that is adjusted in the radial direction to maintain a constant angle of attack over the span of the blade for maximum lift to drag ratio. In contrast, the propeller design of the invention provides an unloaded tip zone starting prior to an end of the tip with negligible, if any, positive lift that is counterintuitive to the purpose of a propeller. The unloaded tip zone results in a significant reduction in noise while maintaining substantially high efficiency. This result occurs even with an increase in RPM to compensate for the reduced lift without requiring a longer propeller. The propeller design tapers a beta angle near the tip to lower the angle of attack so that the lift coefficient prior to the tip goes to zero or less. In at least some embodiments, the beta angle of the invention departs from the standard beta angle at a first location along a span length from the propeller hub and then smoothly slopes with further adjustment of the beta angle into the unloaded tip zone to form a double break propeller. Unloading the tip zone of positive lift from the blade decreases the strength of a tip vortex and reduces the induced drag resulting in a lower noise signature and higher overall efficiency.

Figure 2:
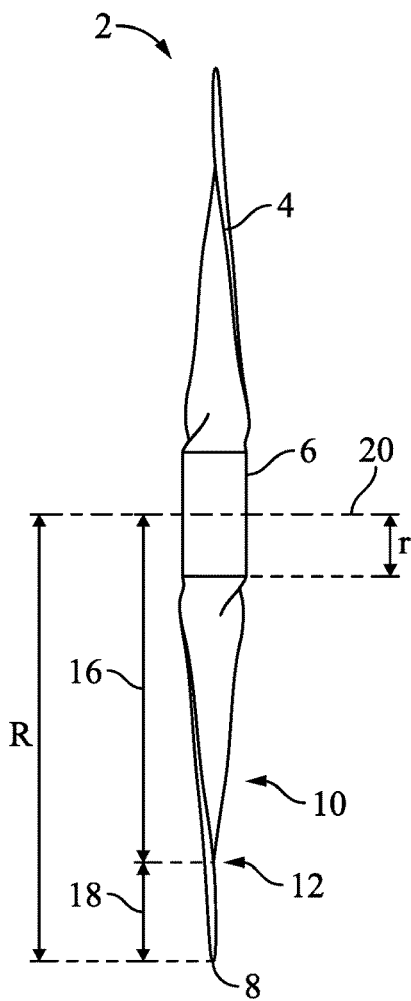
FIG. 2 is a side view of an example of a double break propeller design of the invention.

FIG. 2 is a side view of an example of a double break propeller design of the invention. As an example and without limitation, the propeller can be of a commercially acceptable size, such as 13.3 inches in span 2R having a blade length R from the hub axis 20 of rotation and having a loaded zone 16 and an unloaded tip zone 12, as described herein. The "double break" propeller design uniquely is formed with a hub break at a certain ratio from the hub and a tip break before the tip. In at least one embodiment, the blade of the invention can be formed with a coefficient of lift ($c_l$) similar to the baseline design near the hub. However, in contrast to the baseline design, the $c_l$ begins to decrease (1) a location distal from a central hub herein termed a "hub break" 10 and (2) a location distal from the hub break, herein termed a "tip break" 12, where the $c_l$ asymptotes to zero on the X-axis (or below in some embodiments). A polynomial fit can be used to smooth the $c_l$ distribution between these two locations, particularly at the two break points. The "double-break" notation has two numbers noted herein. The first number as the hub break is the r/R location where the curve starts to break in the hub toward the tip. The second number as the tip break is the r/R location where the lift goes to zero before the tip. For example and without limitation, a designation herein of a "50_90" double break propeller design means that the hub break starts the curve at the 50% r/R location of the span from the hub and the tip break curve asymptotically goes to zero lift (or slightly negative in some embodiments) at the 90% r/R location.

Figure 3:
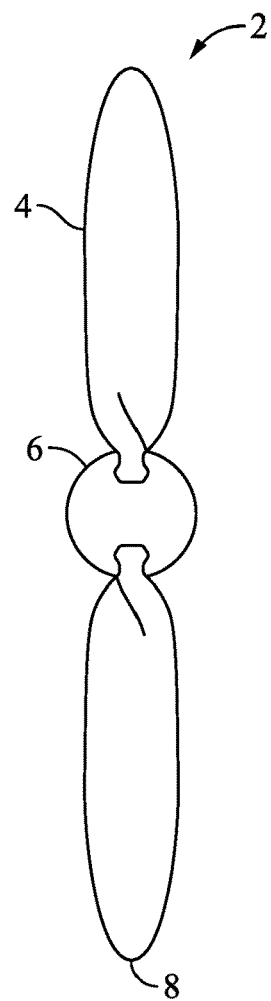
FIG. 3 is a front view of the double break propeller design of FIG. 3.

FIG. 3 is a front view of the double break propeller design of FIG. 3. While the double break concept can be applied to various shapes of propellers, the inventors have found that a propeller with an oval shaped tip is more efficient than other shapes and can benefit from the double break concept for even more efficiency. In at least one embodiment, the propeller can be designed with a constant chord length and then begin an oval shaped taper at a selected r/R ratio. For example, the contact chord length could start being shaped oval at about 0.6 r/R. The ovality further reduces tip vortices.

Figure 4:
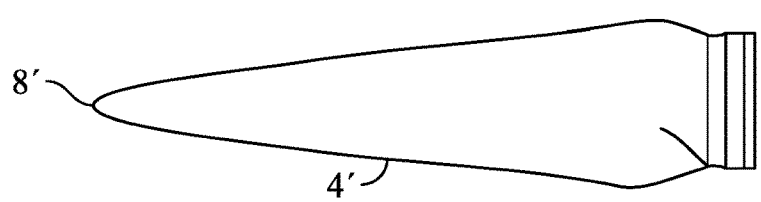
FIG. 4 is a side photo of an elliptical propeller blade designated as a prior art "baseline" propeller.

FIG. 4 is a side photo of a typical elliptical propeller blade designated as a "baseline" propeller blade. Some comparisons herein refer to a "baseline" propeller. A baseline propeller blade 4' herein is a propeller blade designed using the traditional BEMT approach that sets the coefficient of lift ("Cl") corresponding to the angle of attack ("AOA") associated with maximum $c_l/c_d$ over the span of the propeller and adjusts the radial β (twist) angle to satisfy this constraint. As the tangential velocity increases along the span of blade, the corresponding β angle must decrease to maintain these conditions. These constraints result in a propeller designed for minimum induced losses in which the tip 8' of the propeller blade 4' generates most of the lift and thrust. These highly loaded tip conditions generate strong coherent vortices that are the primary flow disturbance associated with the blade and generate most of the perceived noise.

Figure 5:
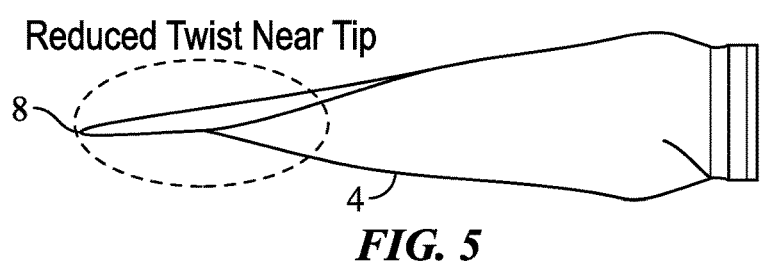
FIG. 5 is a photo of an example of an embodiment of an improved propeller blade according to the teachings herein.

FIG. 5 is a photo of an example of an embodiment of an improved propeller blade, according to the teachings herein. The improved propeller having a blade 4 is designed so that the taper stops increasing as rapidly compared to the baseline propeller blade, so that in some embodiments, the section lift coefficients resulted in a value of zero at the blade tip 8, and other embodiments there are slightly negative section lift coefficients at the tip. The result is less pressure differential between the upper and lower surface of the propeller toward the tip to produce less lift and reduce tip vortices that are a significant contribution to the overall propeller noise. As described above, the propellers of the invention include a double break propeller design with a hub break and a tip break.

In at least one embodiment, the propeller design can include a prescribed coefficient of lift for each of the design elements of the propeller blade from the hub to the tip. Having this flexibility in design allows the design of propellers to intentionally include an unloaded tip zone.

Depending on the performance criteria, various lengths of the unloaded tip zone compared to the overall length propeller length from the hub to the tip, expressed as a percentage, can be designed and produced. In some embodiments, the unloaded tip zone can be greater than 0% to 60%, in other embodiments the unloaded range can be greater than 0% to 50%, in other embodiments the unloaded range can be greater than 0% to 40%, in other embodiments the unloaded range can be greater than 0% to 30%, in other embodiments the unloaded range can be greater than 0% to 20%, in other embodiments the unloaded range can be greater than 0% to 10%, or in other embodiments the unloaded range can be greater than 0% to 3%, inclusive and any integer or fraction thereof, such as 3%-50% and others. Thus, the percentage length of the loaded zone of the propeller would be Loaded Zone=1−Unloaded tip zone percentage.

The invention is not restricted to a particular blade cross sectional profile and several known cross sectional profiles have been tested. Many if not all of the blade profiles can benefit from the teachings herein and the unloaded tip zone for noise reduction and efficiency. However, even though many blade profiles can be used, for optimizing overall performance including using the teachings herein, there are factors for selecting a blade profile. Selection of an appropriate airfoil can be an important decision for a well-made propeller to satisfy performance goals. Based on studies by the inventors, the following seven guidelines are used to evaluate airfoils to meet these requirements: 1) sufficient thickness, 2) high lift coefficient, 3) high maximum lift to drag ratio, 4) broad peak at the maximum lift to drag ratio, 5) a linear lift curve slope over the airfoil operating angle of attack range for the propeller, 6) low drag over the operating angle of attack range, and 7) the effect of Reynolds number on airfoil aerodynamic data. While it is unlikely that all these criteria would be satisfied in one airfoil shape, the factors will help narrow the selection to more likely airfoils that will have the best performance over the range of operating conditions.

Figure 6A:
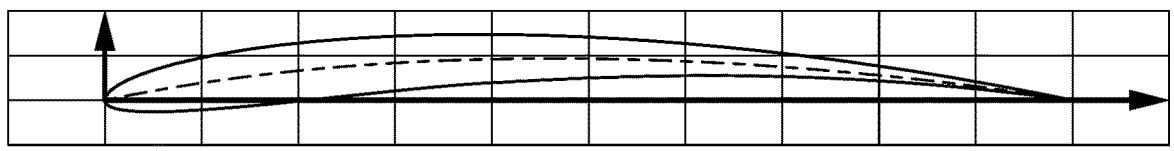
FIG. 6A is a diagram illustrating a representative portion of a cross section of a GM-15 design propeller.
Figure 8A:
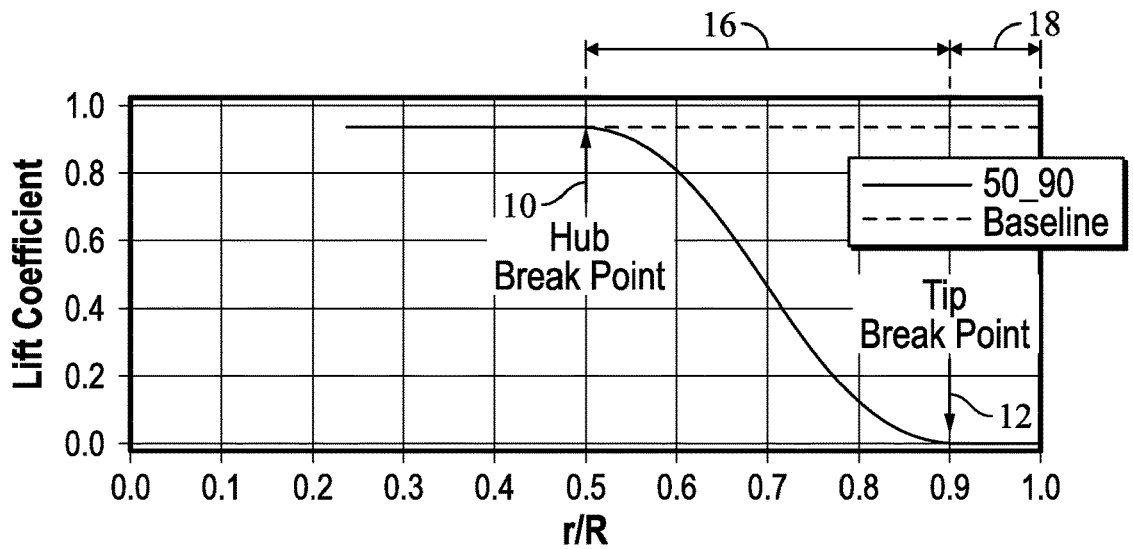
FIG. 8A is an illustrative graph showing a lift coefficient relative to an r/R ratio of a baseline propeller blade compared to an example of a double break propeller blade according to the teachings herein.

FIG. 6A is a diagram illustrating a representative portion of a cross section of a GM-15 design propeller. The GM-15 is relatively thin, only 6.7% chord and has a thin trailing edge not making it a desirable airfoil if judged only on these qualities. As shown in FIG. 8A, it has the highest coefficient of lift/coefficient of drag ($c_l/c_d$) of all the airfoils. The GM-15 is a good airfoil for aerodynamic considerations but may be thin for some applications. The GM-15 airfoil has a maximum thickness of 6.7% at 20.5% chord and a maximum camber of 4.8% at 49.3% chord.

Figure 6B:
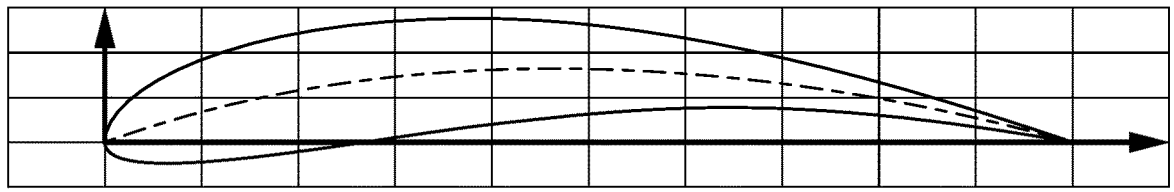
FIG. 6B is a diagram illustrating a representative portion of a cross section of a GOE 225 design propeller.

FIG. 6B is a diagram illustrating a representative portion of a cross section of a GOE 225 design propeller. This airfoil is part of a series of airfoils designed at Gottingen University in Germany early in the days of aviation possibly during World War I and into the 1920s and 1930s. The number is a sequential number given when a new airfoil was developed. The GOE 225 airfoil has a maximum thickness of 12.8% at 19.7% chord and a maximum camber of 7.6% at 49.7% chord.

Figure 6C:
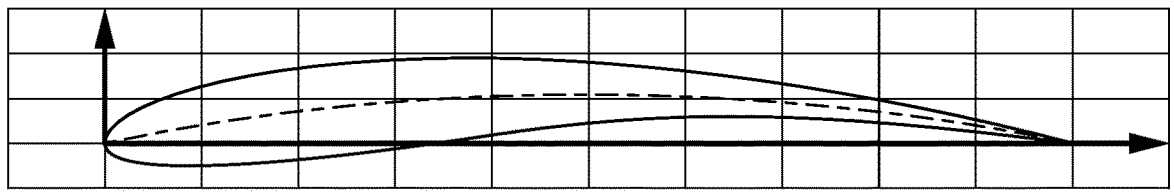
FIG. 6C is a diagram illustrating a representative portion of a cross section of a GOE 358 design propeller.

FIG. 6C is a diagram illustrating a representative portion of a cross section of a GOE 358 design propeller. This design is another of the airfoils designed at Gottingen University. The number would suggest it is a later design than the GOE 225. The GOE 358 airfoil has a maximum thickness at 10.9% at 20% chord and maximum camber at 5.6% at 50% chord.

Figure 6D:
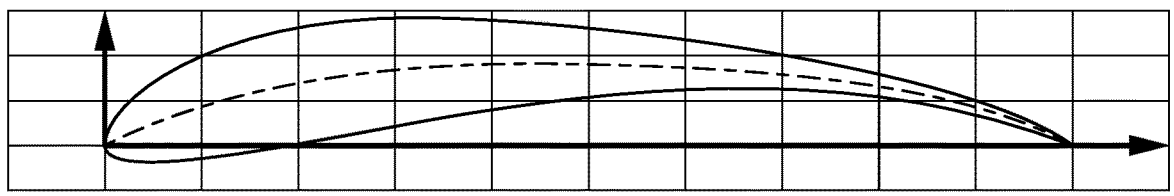
FIG. 6D is a diagram illustrating a representative portion of a cross section of a S1223 design propeller.

FIG. 6D is a diagram illustrating a representative portion of a cross section of a S1223 design propeller. The design involves combining the favorable effects of both a concave pressure recovery and aft loading to achieve maximum lift at a design Reynolds number of 200,000. It has a high $c_l$ maximum of 2.11 at a Re number of 200,000. This is considered a high lift airfoil and is highly aft loaded. This airfoil has been used in motorsports and hydrokinetic turbine applications (hydrofoil), and for heavy lift cargo planes. The S1223 airfoil has a maximum thickness of 12.1% at 19.8% chord and a maximum camber of 8.1% at 50% chord.

Figure 6E:
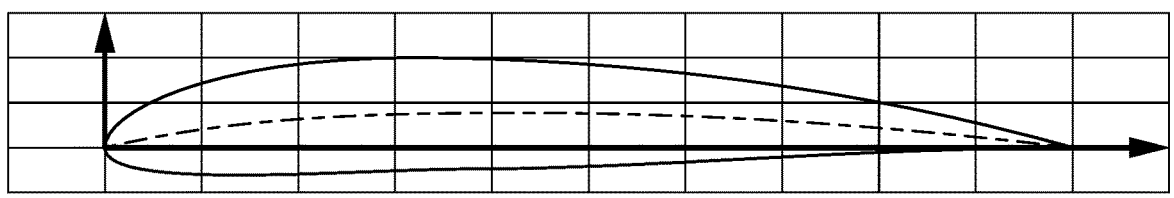
FIG. 6E is a diagram illustrating a representative portion of a cross section of a Clark Y design propeller.

FIG. 6E is a diagram illustrating a representative portion of a cross section of a Clark Y design propeller. The Clark Y was designed in the early 1920s. The Clark Y airfoil was used on most American propellers from the mid-1920s to the mid-1930s. The Clark Y was not for use at higher speeds where compressibility effects were significant and fell out of favor in the early 1940s. Today it is still widely used on small homebuilt aircraft and radio controlled models. It is used for many small UAS applications. The Clark Y airfoil has a maximum thickness of 11.7% at 28% chord and a maximum camber of 3.4% at 42% chord.

Figure 7A:
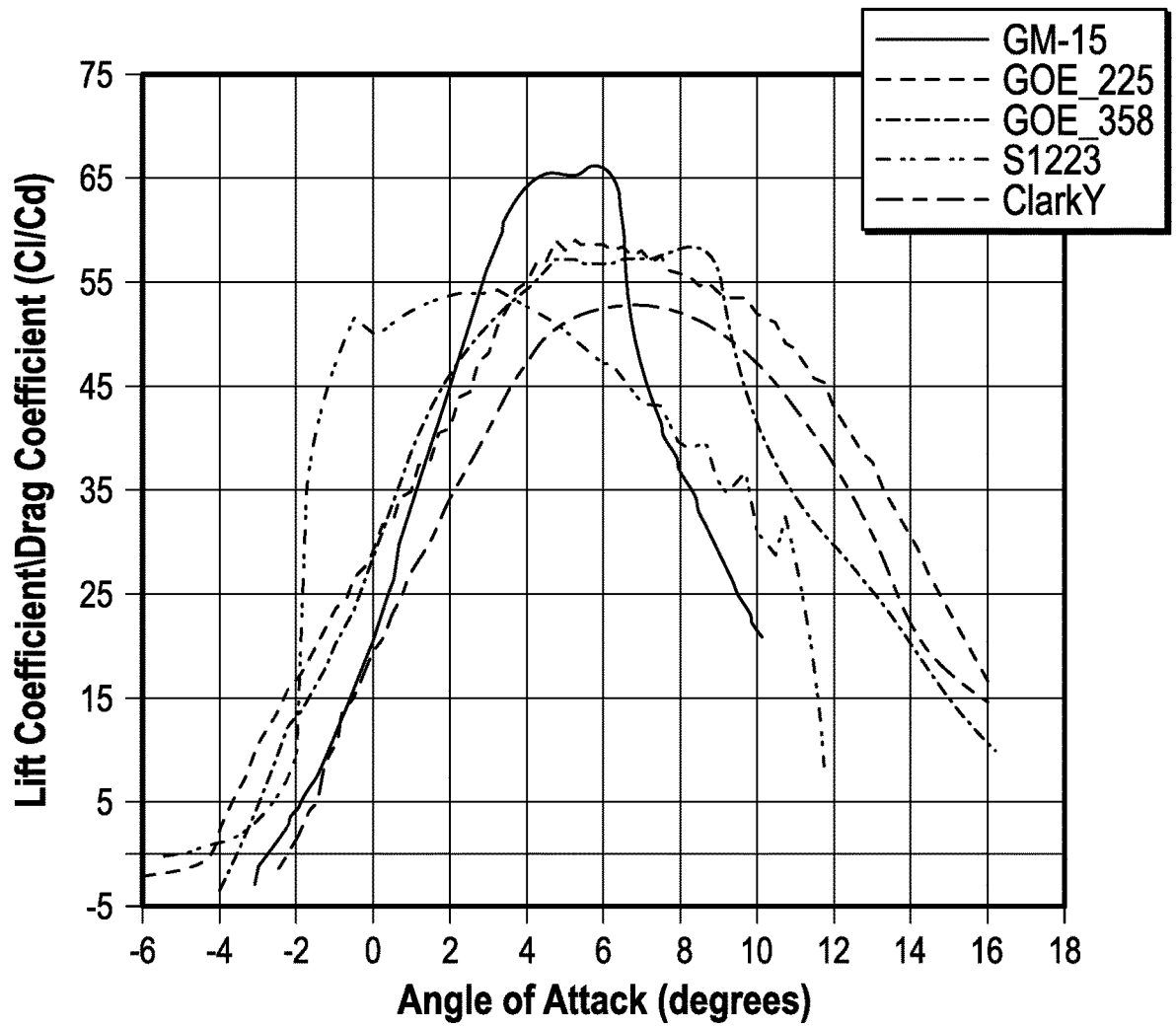
FIG. 7A is an illustrative graph of airfoil aerodynamic data of a ratio of coefficient of lift/coefficient of drag relative to angle of attack for known airfoils illustrated in FIGS. 6A-6E for normal operational design conditions for UASs.
Figure 7B:
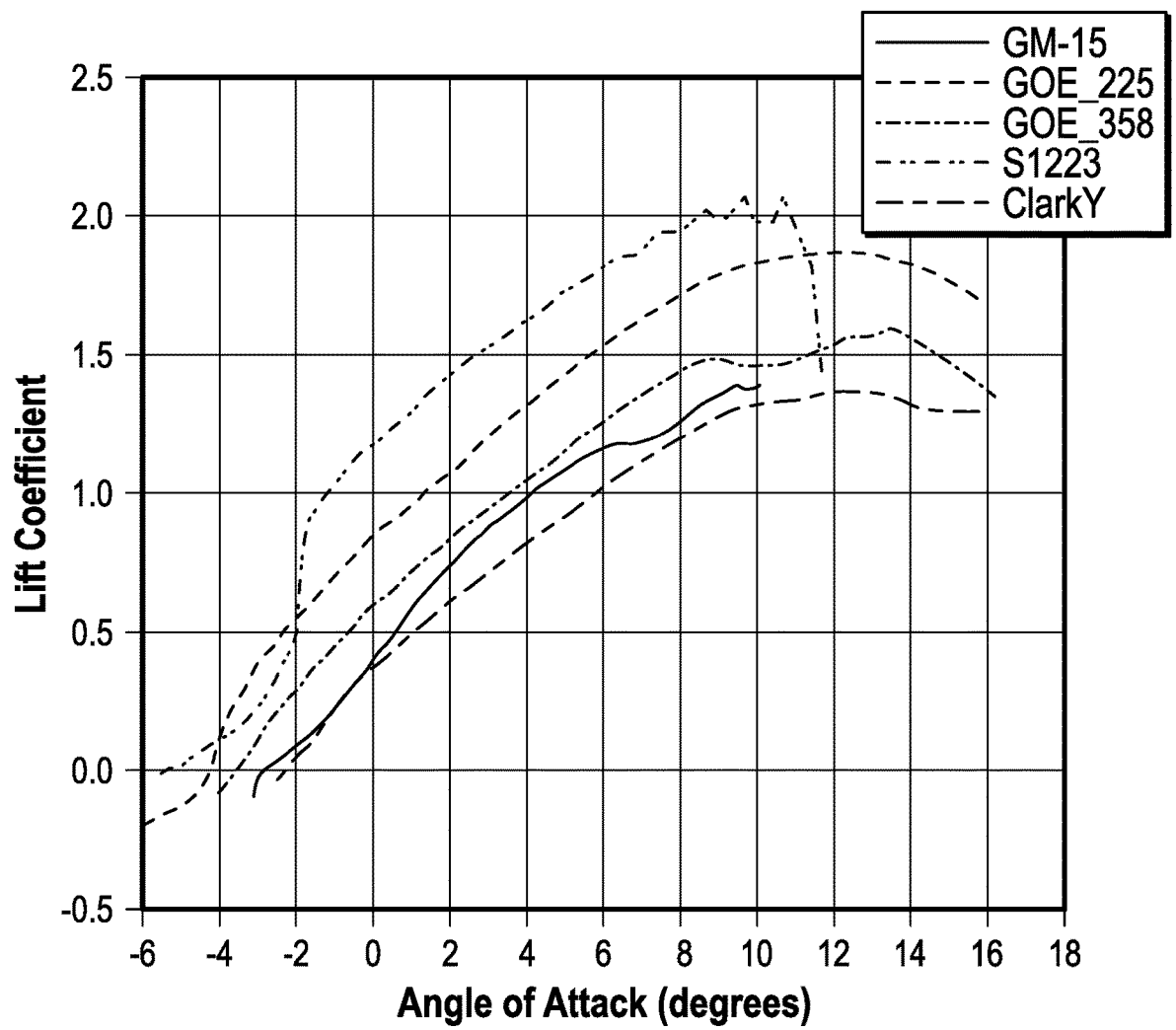
FIG. 7B is an illustrative graph of airfoil aerodynamic data of coefficient of lift relative to angle of attack of the airfoils of FIG. 7A.
Figure 7C:
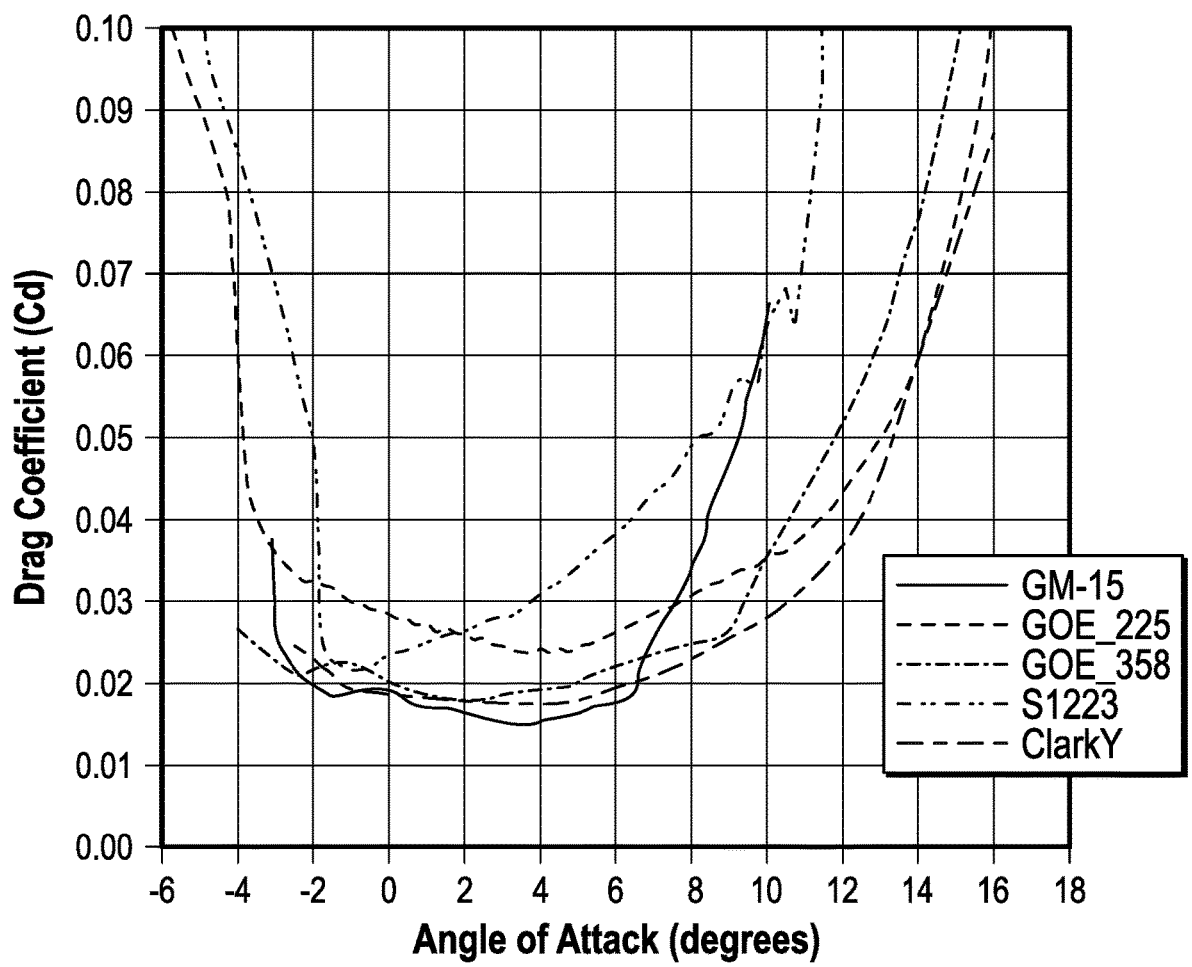
FIG. 7C is an illustrative graph of airfoil aerodynamic data of drag coefficient relative to angle of attack of the known airfoils of FIG. 7A.

FIG. 7A is an illustrative graph of airfoil aerodynamic data of a ratio of coefficient of lift/coefficient of drag relative to angle of attack for known airfoils illustrated in FIGS. 6A-6E for normal operational design conditions for UASs. FIG. 7B is an illustrative graph of airfoil aerodynamic data of coefficient of lift relative to angle of attack of the airfoils of FIG. 7A. FIG. 7C is an illustrative graph of airfoil aerodynamic data of drag coefficient relative to angle of attack of the known airfoils of FIG. 7A.

With the above criteria in mind, it is important to pick an appropriate airfoil with acceptable performance for the propeller application. Known and nonlimiting airfoil designs include GM-15, GOE 225, GOE 358, and S1223, and Clark Y designs. While the GM-15 design propeller was the design selected for detailed experiments as described herein, it is understood that different airfoil designs may be advantageous over others for different applications. The principles taught here can apply to other airfoils. At an initial phase, propellers were made using the standard BEMT criteria and tested in a wind tunnel.

Unless stated otherwise, the propellers herein were designed for a thrust ("T") of 2.5 pounds force ("lbf") (11 newtons) at a freestream velocity of 44 feet per second ("fps") (13.4 meters per second) at a Reynolds number of 100,000 and an altitude of 7000 ft (2134 m), which are typical design conditions for small UASs.

While each airfoil offers advantages and disadvantages, for purposes of illustration of the inventive concepts, the discussion herein and most of the test results using the inventive design are based on the GM-15 airfoil. Of these airfoils, the GM-15 propeller requires the lowest mechanical power to meet, for example, the on-design conditions as stated in the previous paragraph. This propeller also had the lowest measured peak Sound Pressure Level ("SPL"). Based on the data in FIG. 7A-7C for the GM-15 airfoil chosen for experiments detailed herein, the design angles of attack ("AOAs") are 5.2 degrees located at the middle of the $c_l/c_d$ maximum range and 3.5 degrees for the location where the $c_l/c_d$ plot begins to break to the maximum value. While the GM-15 is used, the concepts are applicable to any airfoil.

Figure 8B:
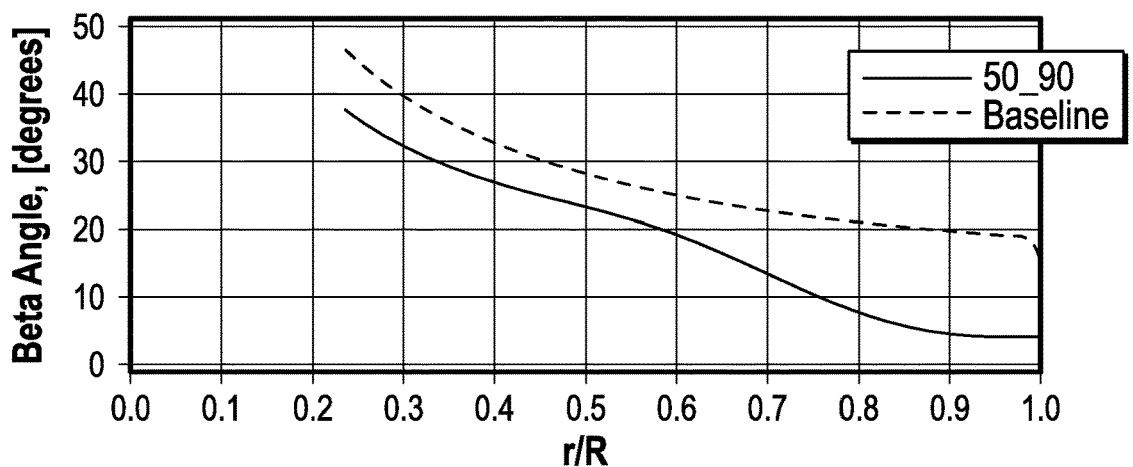
FIG. 8B is an illustrative graph showing a beta β angle relative to the r/R of the propellers in FIG. 8A.
Figure 8C:
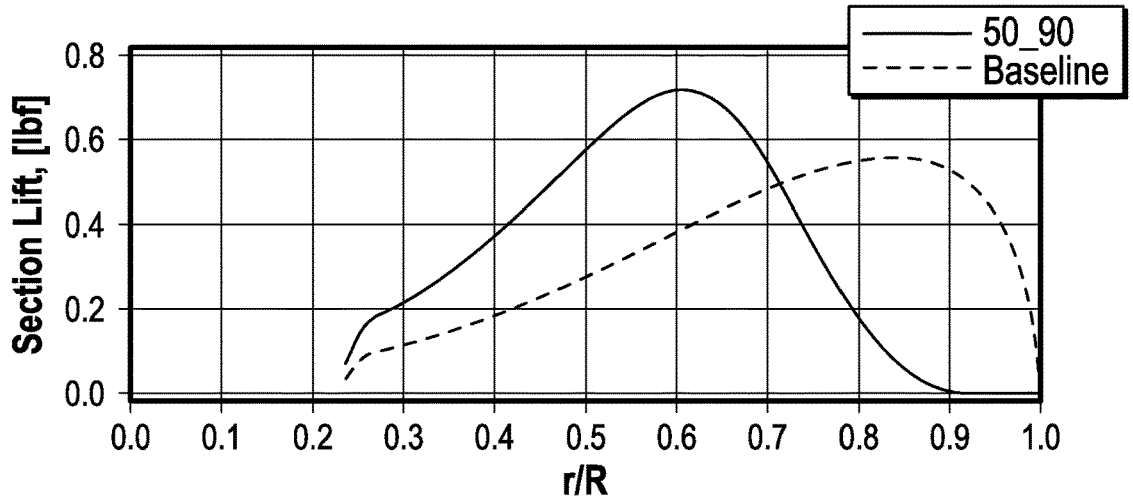
FIG. 8C is an illustrative graph showing a section lift relative to the r/R ratio of the propellers in FIG. 8A.

FIG. 8A is an illustrative graph showing a lift coefficient relative to an r/R ratio of a baseline propeller blade compared to an example of a double break propeller blade according to the teachings herein. FIG. 8B is an illustrative graph showing a beta β angle relative to the r/R of the propellers in FIG. 8A. FIG. 8C is an illustrative graph showing a section lift relative to the r/R ratio of the propellers in FIG. 8A. The $c_l$ and AOA for the baseline propeller are held constant in an effort to maintain maximum $c_l/c_d$ over the span of the blade. As the tangential velocity increases along the span of blade, the corresponding β angle must decrease to maintain these conditions. In at least one embodiment, the innovative double break design approach can have a smooth transition from the baseline $c_l$ and AOA near the hub that asymptotically approaches zero lift at the tip. This design approach effectively unloads the tip of the propeller, reducing induced drag and the strength of the tip vortex.

It should be noted that the bell shaped lift distribution suggested by Prandtl as an alternative to the elliptical lift profile cannot be practically achieved on a propeller due to the increasing tangential velocity across the span of the blade. The best that can be achieved is a reduction in the lift coefficient that tapers the amount of lift generated near the tip. For a propeller, this requires a balance in the design approach because the high speed tip is typically where the most lift and thrust are generated. Reducing the loading near the tip forces the propeller to spin slightly faster to generate the required thrust.

Generally, the propeller blade is configured to be coupled to a hub of a propeller. The blade has a blade length from a center of the hub to a blade tip. The blade is configured with a loaded zone of lift that is proximal to the hub, and is shown as an example in FIG. 8A to be about 0.5 r/R (that is about 50%) of the blade length. The blade also has an unloaded tip zone at a distal end of the blade from the hub. The unloaded tip zone has a length greater than zero, that is, the unloaded top zone starts before the tip end. The unloaded tip zone can be any amount of the blade length minus the length of the loaded zone. In this example, the unloaded tip zone starts at about 0.9 r/R (about 90%) and continues to the tip at 1.0 r/R (100%), and therefore has a length of about 10%. The lift coefficient value relative to the r/R value creates a lift coefficient curve having a slope at any point on the curve, shown in FIG. 8A. The lift coefficient of the propeller blade has a positive value for creating lift. In the nonlimiting embodiment shown in FIG. 8A, the lift coefficient slope in the loaded zone is zero along a length of the loaded zone with a constant lift coefficient unchanging, generally with a constant AOA that is not shown. At a first location along the blade length, identified herein as the hub break, the lift coefficient slope in the loaded zone changes to a first negative slope that reduces the lift coefficient to a less positive value and is a steeper slope than the lift coefficient slope before the hub break. At another location along the blade length that is distal from the hub break, the lift coefficient slope changes again to a second negative slope that is less steep than the first negative slope and reduces the lift coefficient slower along the blade length than the first negative slope. In at least one embodiment, the lift coefficient slope smoothly changes from the second negative slope to again a zero slope at the unloaded tip zone that can continue for the length of the unloaded tip zone. A slight variation in the lift coefficient value such as +/−0.05 $c_l$ of zero is acceptable to substantively still unload the tip and is considered a "zero" lift coefficient for purposes herein.

FIG. 8C shows the design lift generated at each radial section of the propeller blade for the two designs. In this example, the baseline propeller shows a peak in section lift at 90% of the blade span while the double break design moves the peak back to (0.6) 60% of the blade span. The double break design also indicates no lift being generated over the last 10% of the span creating an effective barrier between the suction and pressure sides of the propeller blade. The tapering of the section lift for the baseline propeller is due to the reduction in the chord length of the oval tip incorporated in the blade design. Both of these propellers are designed for the same thrust at the same freestream velocity (T=2.5 lbf and V=44 ft/s), so that the section lifts integrated over the span of the blades are the same.

Since the baseline design holds the $c_l$ constant by setting the AOA to achieve maximum $c_l/c_d$, each radial section operates at the conditions for maximum two-dimensional efficiency. By tapering the $c_l$ radial distribution, the double break design obviously cannot achieve this high efficiency condition. However, a portion of the efficiency can be reclaimed by the reduction in induced drag due to the unloading of the tip. The double break design approach has an inherent balance in how much of the blade to unload. Moving the break points toward the hub will shift the maximum lift generation away from the tip which will likely reduce the strength of tip vortex and therefore the noise generated but will also reduce the overall efficiency. Moving the break points toward the tip is likely to increase efficiency and the strength of the tip vortex which will increase noise.

Experiment 1

This experiment examined where to begin the transition to zero lift at the propeller tip and also to explore where zero lift should occur on the propeller blade. This experiment also sought to determine if there is an optimum combination of the break points that would reduce the power required and at the same time reduce the noise generated as a result of unloading the propeller tip.

FIG. 9A is an illustrative graph showing the test matrix of double break configurations tested. For this study the GM-15 airfoil was used with the same design point previously described and using an exemplary 3.5 degree AOA at the hub. The graph shows that zero lift occurred at an AOA of −2.72 degrees. The break location for the hub ranged from 0.90 r/R to 0.40 r/R.

FIG. 9B is an illustrative graph showing the $c_l$ for a sampling of the double break designs from FIG. 9A. The results of double break configurations tests display the data from 80% hub break to 40% hub break using a constant tip break value of 90%. It is possible to see the effect of changing the hub break location on both propeller mechanical power required in FIG. 11, and the SPL in FIG. 12 and FIG. 17, below.

Figure 10:
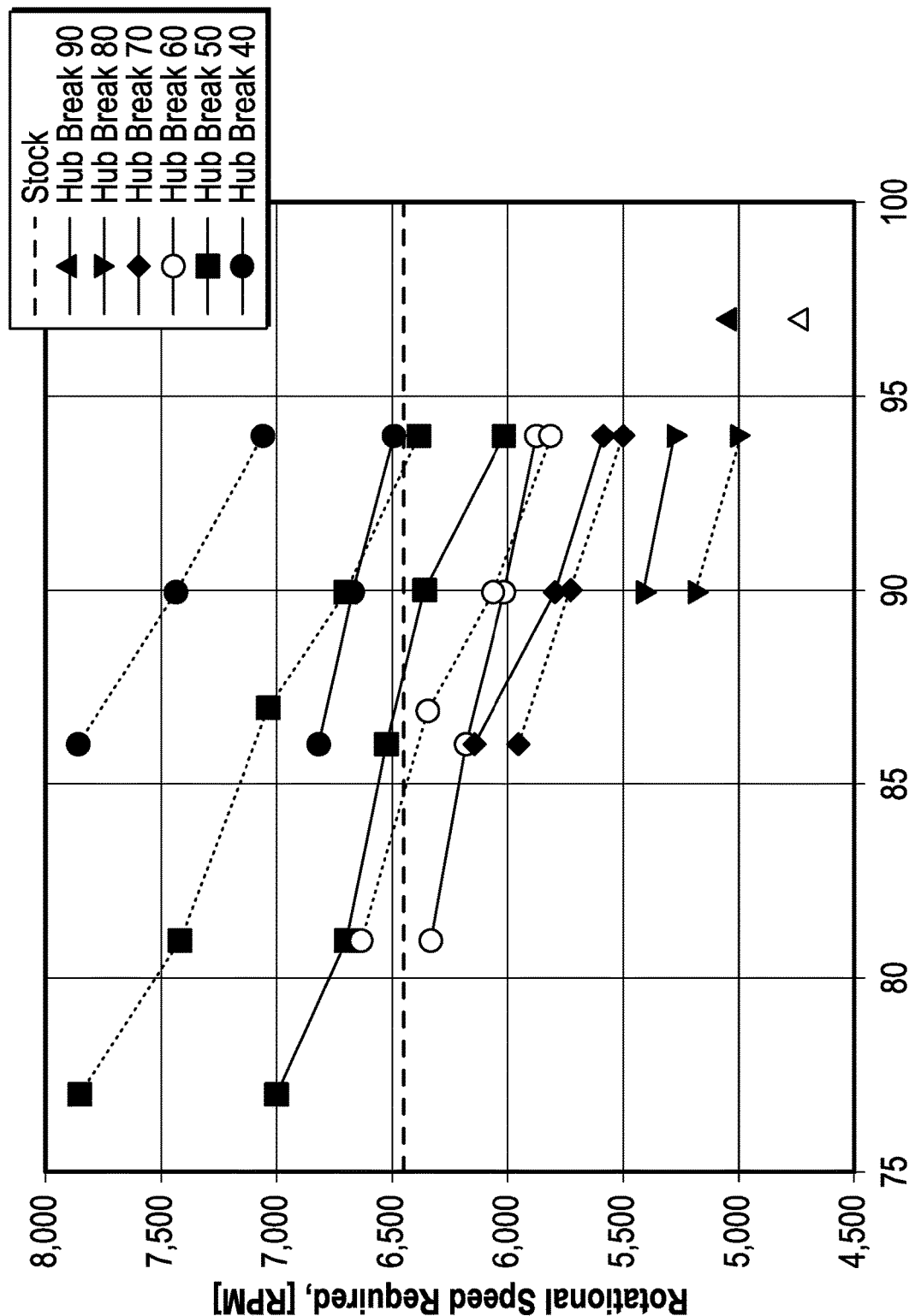
FIG. 10 is an illustrative graph of rotational speed for all the tested propellers as a function of hub break and tip break percentage.

FIG. 10 is an illustrative graph of rotational speed for all the tested propellers as a function of hub break and tip break percentage. As referenced above, unless stated otherwise, the tests were for design conditions of T=2.5 lbf at 44 ft/s freestream velocity. The hub break percentages varied from 40% to 90% and the X-axis provides the tip break percentage. Experimental results are shown with solid lines between data points and BEMT predicted results are shown with dashed lines between data points, except for the 90% data with only one point showing a solid data point for the experimental result and a hollow data point for the BEMT predicted result. The rotational speed required decreases as both hub and tip break points increase. This is due to the larger portion of the blade operating at the AOA for high $c_l$ requiring lower dynamic pressure to achieve the same overall lift. The stock propeller with its slender chord requires 6450 RPM while the 90_97 propeller requires only 5060 RPM. The stock props spin faster than all but the 40 hub break propellers and the 50 hub break propellers with tip breaks less than 90. Typical propeller design rule of thumb indicates that lower RPM is directly related to lower SPL but as will be shown this is not the case for these unloaded tip propellers. Also shown are the rotational speeds predicted by the BEMT design code for each propeller. The predictions show the same trend of decreasing RPM with increases in hub and tip break points as the experimental results.

As shown particularly in FIG. 10, the BEMT code significantly over predicts the RPM and required for the 40 and 50 hub break propellers, predicts the RPM fairly well for the 60 and 70 hub break propellers and under predicts the RPM for the 80 and 90 hub break propellers. Uncertainty in the aerodynamic data for the GM-15 airfoil cross section can account for some of this discrepancy but the large over prediction for the 40 and 50 hub break propellers is an indication that the BEMT formulation is having difficulty predicting the induced velocities near the tip of the unloaded propellers. Further, as shown particularly in FIG. 11, the BEMT design code greatly over predicts the mechanical power required for the low percentage hub and tip breaks and under predicts the mechanical power required for the high percentage hub and tip break points. It is theorized that these inaccurate predictions are due to the reduction in the induced drag created by unloading the tip that the BEMT design code cannot predict.

Figure 11:
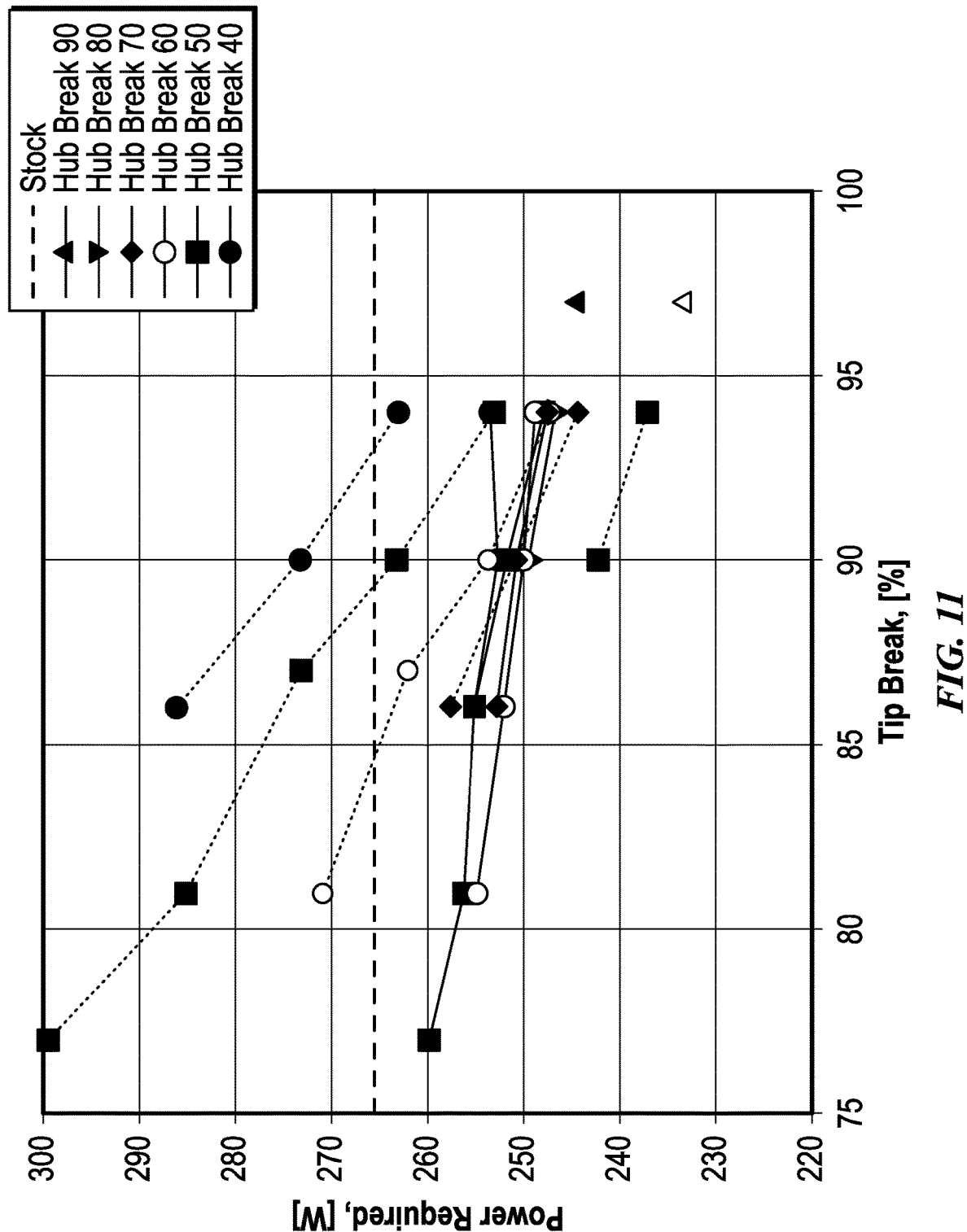
FIG. 11 is an illustrative graph of mechanical power required for all the tested propellers as a function of hub break and tip break percentage.

FIG. 11 is an illustrative graph of mechanical power required for all the tested propellers as a function of hub break and tip break percentage. The hub break percentages varied from 40% to 90% and the X-axis provides the tip break percentage. As in FIG. 10, experimental results are shown with solid lines between data points and BEMT predicted results are shown with dashed lines between data points, except for the 90% data with only one point showing a solid data point for the experimental result and a hollow data point for the BEMT predicted result. The hub break lines collapse on each other making the power required primarily a function of the tip break location. This phenomenon is an unexpected result, considering the large differences in the rotational speeds shown in FIG. 10 and the direct result of significant reductions in torque as the hub break is moved further from the tip. The small decrease in power required as the tip break point increases is likely due to the smaller region of the blade that is not operating near the AOA for maximum $c_l/c_d$. The BEMT design code greatly over predicts the mechanical power required for the low hub and tip break points and under predicts the mechanical power required for the high hub and tip break points. It is theorized that this incorrect predictions are due to a reduction in the induced drag created by unloading the tip that the BEMT design code cannot predict. The custom propellers are more efficient than the stock propeller that is likely due in part to the higher $c_l/c_d$ of the GM-15 airfoil rather than the unknown airfoil cross section of the stock propeller. This efficiency demonstrates that proper airfoil cross section selection and optimized spanwise AOA design can unload the tip without sacrificing overall efficiency of the propeller that would adversely affect aircraft range and endurance.

Figure 12:
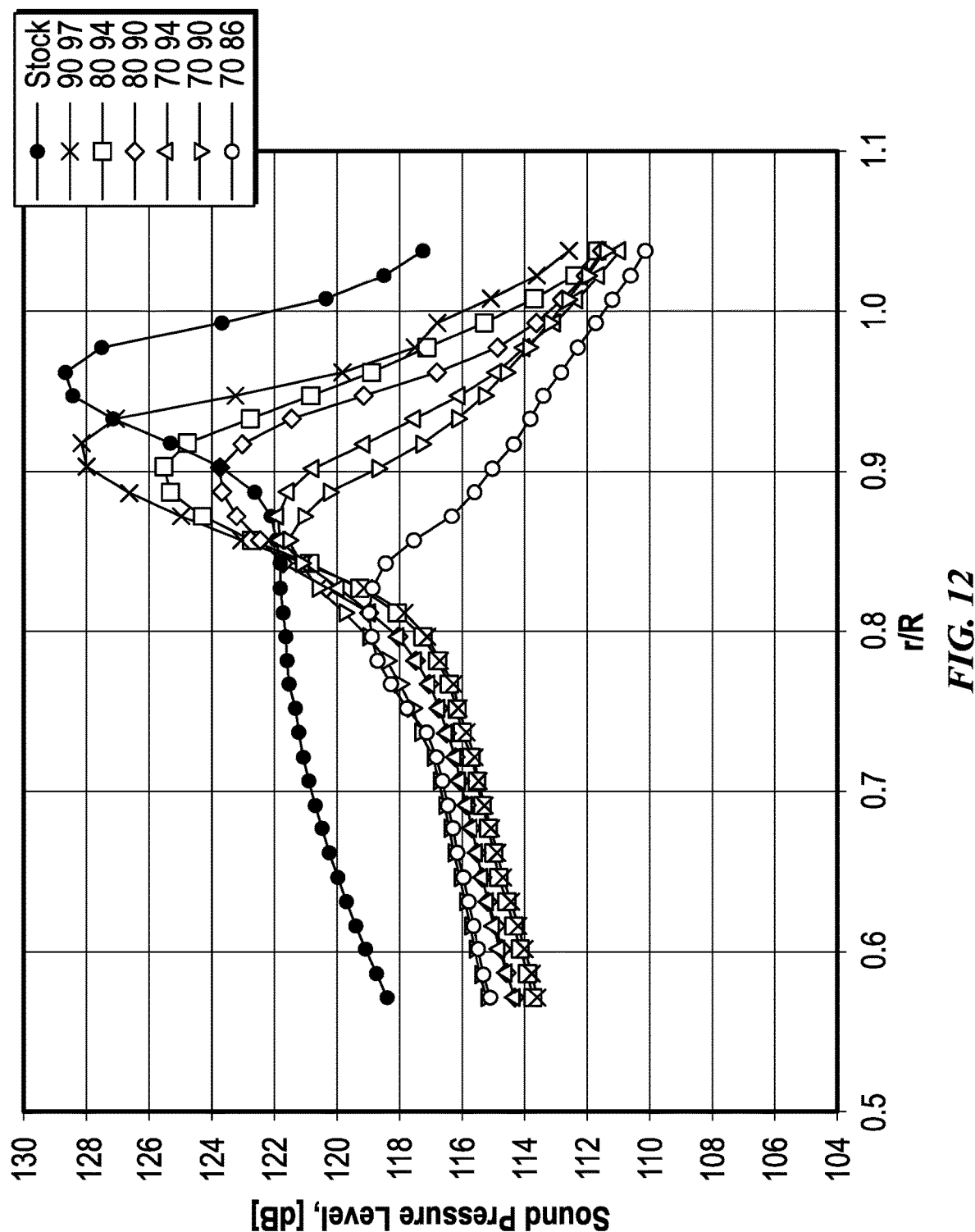
FIG. 12 is an illustrative graph of radial SPL distributions for 90, 80 and 70 hub break point percentage propellers.

FIG. 12 is an illustrative graph of radial SPL distributions for 90, 80 and 70 hub break point percentage propellers. The stock propeller has a large peak in SPL near the tip due to the strong vortices generated by the lift produced at the tip. The slight movement of the peak SPL toward the hub is due to contraction of the stream tube as the flow is accelerated by the propeller across the plane of rotation. The SPL near the hub is much lower for the custom propellers of the invention, because of the larger cord length that reduces the thrust loading allowing the propellers to spin slower and create a smaller pressure difference between the suction and pressure sides of the blades. The 90 hub break point propeller has a slightly lower peak SPL at a location closer to the hub than the stock propeller. As the hub and tip break points decrease and more of the propeller tip is unloaded, the peak SPL decreases and moves toward the hub. The peak SPL also becomes broader as hub and tip break points decrease and the lift generation is moved away from the tip.

Figure 13:
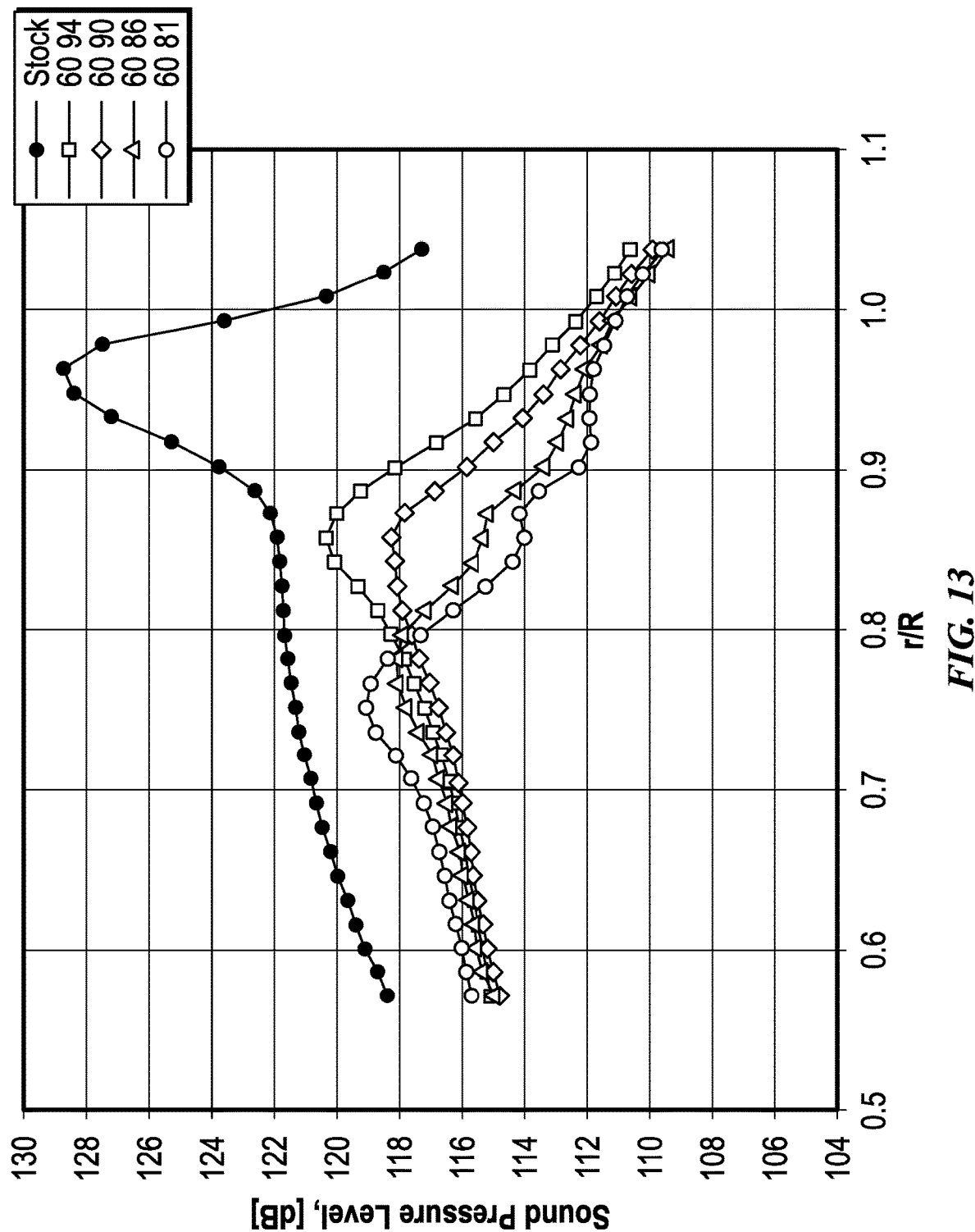
FIG. 13 is an illustrative graph of radial SPL distributions for 60 hub break point percentage propellers.

FIG. 13 is an illustrative graph of radial SPL distributions for 60 hub break point percentage propellers. The 60_94 and 60_90 propellers continue the trend seen FIG. 12 with the decreasing peak SPL and movement of the peak toward the hub. The peak for the 60_86 and 60_81 move even further toward the hub, but increase slightly.

Figure 14:
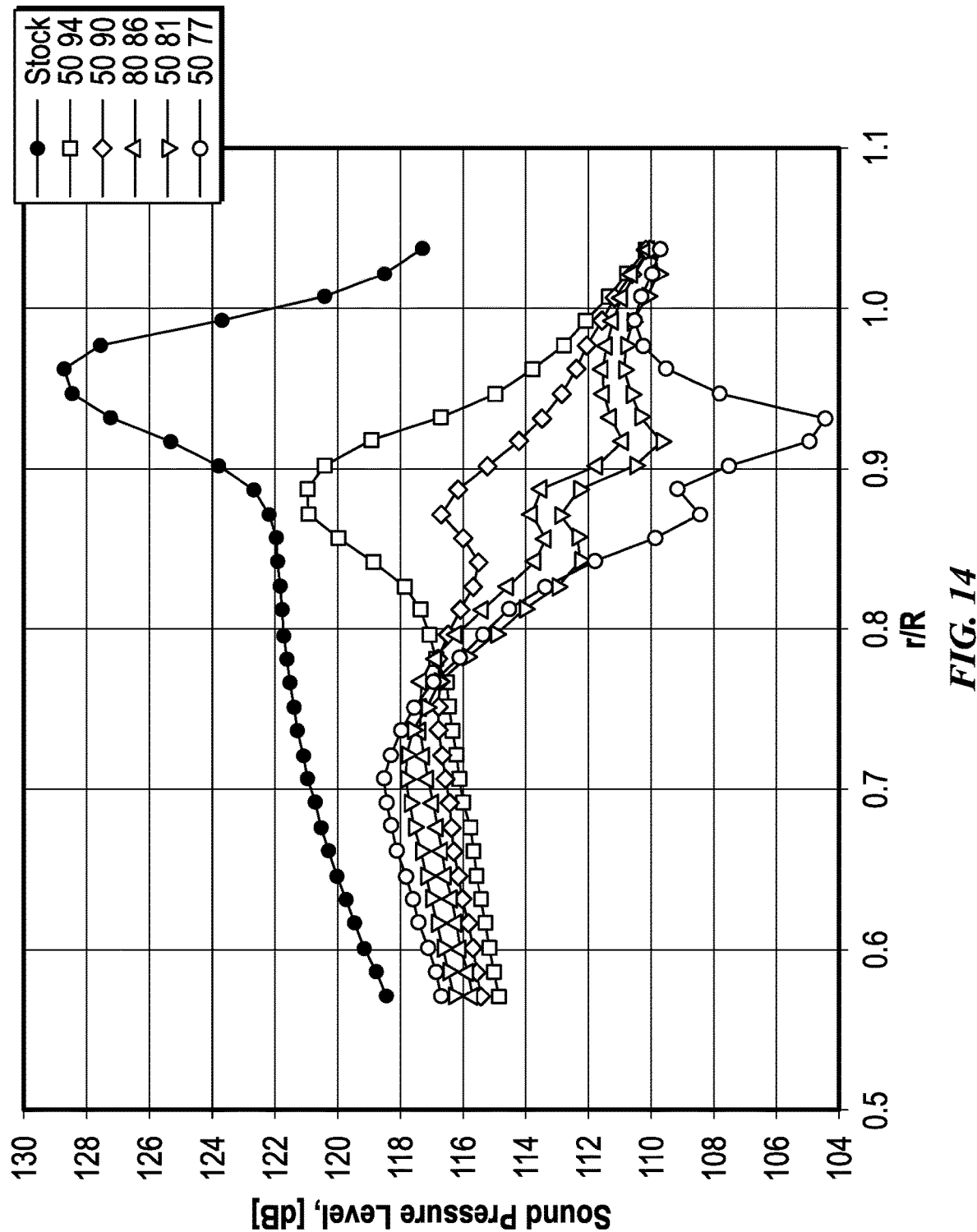
FIG. 14 is an illustrative graph of radial SPL distributions for 50 hub break point percentage propellers.

In FIG. 14 is an illustrative graph of radial SPL distributions for 50 hub break point percentage propellers. With the exception of the 50_94, the SPL for this set of propellers no longer has the prominent peak associated roll up of the tip vortex that can be clearly seen in the other custom designed propellers. The SPL decreases, because of the reduction in tip vortices due to unloading near the tip, but there is also a balance with rotational speed which increases as tip break point decreases (moves closer to the hub) that tends to increase SPL. So that the region of the blade near the hub is required to generate more thrust and therefore produces a higher SPL in this region. As discussed herein, the 50_90 provided advantageous performance for the parameters provided.

Figure 15:
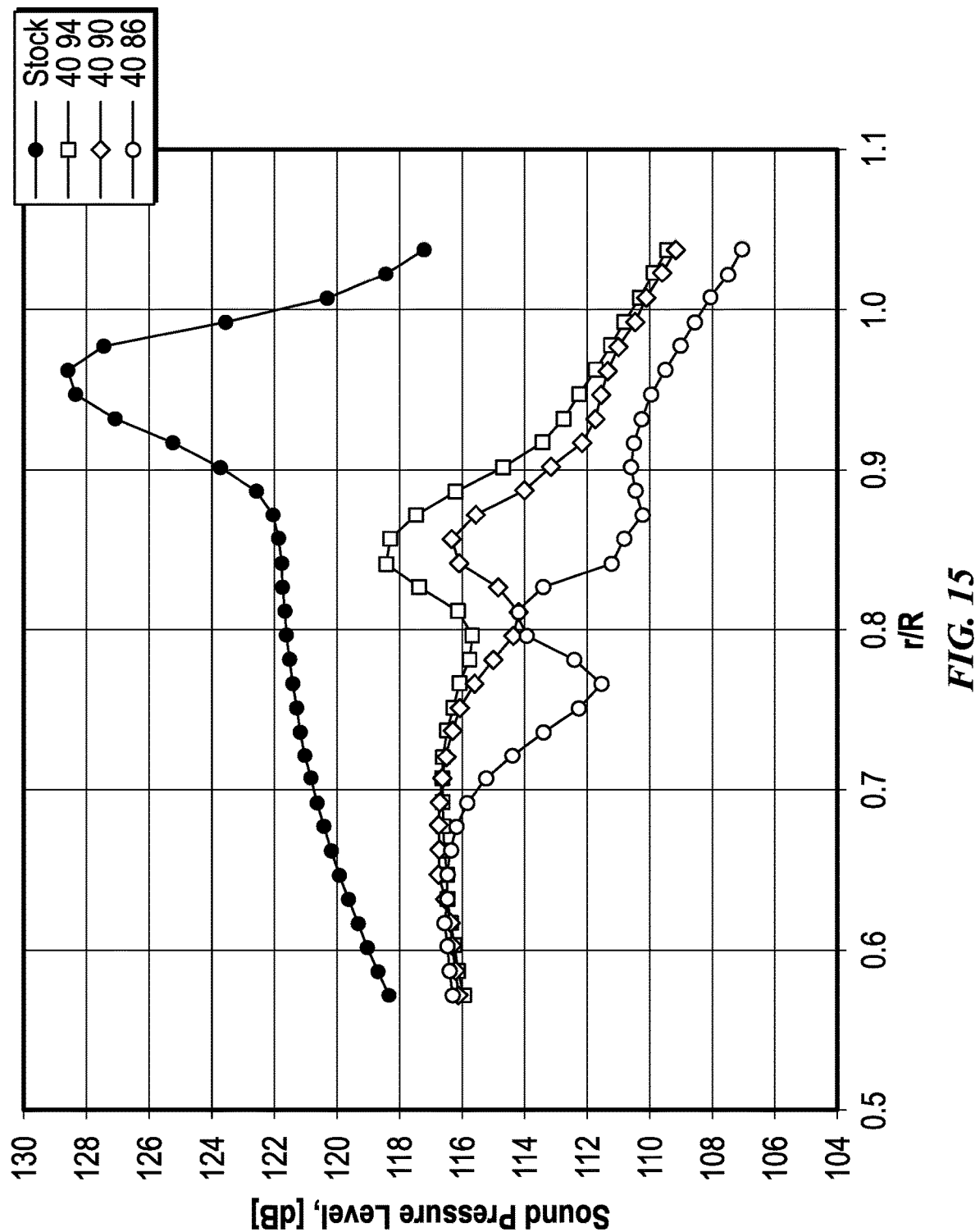
FIG. 15 is an illustrative graph of radial SPL distributions for 40 hub break point percentage propellers.

FIG. 15 is an illustrative graph of radial SPL distributions for 40 hub break point percentage propellers. Similar trends are seen in the 40 hub break set of propellers. The SPL radial contours without distinct peaks are indicative of the rapid breakdown of the tip vortex or roll up of a double vortex.

Figure 16A:
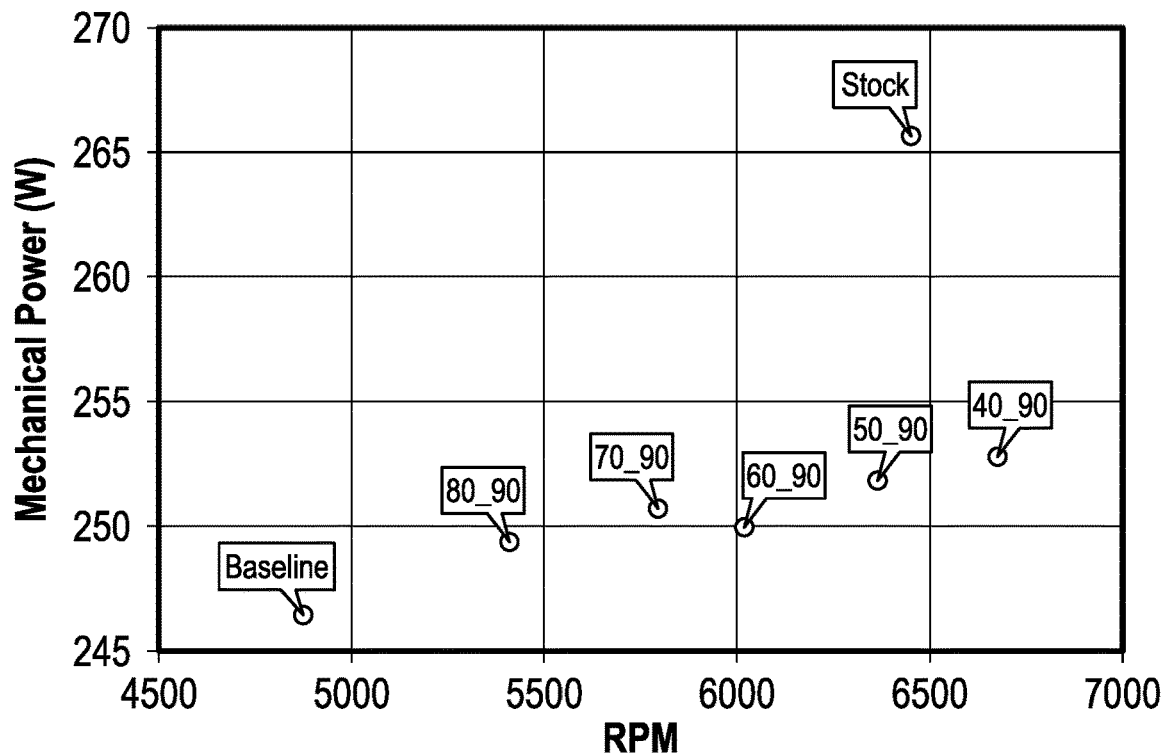
FIG. 16A is an illustrative graph of mechanical power for hub breaks from 80% to 40% with a constant tip break of 90%.

FIG. 16A is an illustrative graph of mechanical power for hub breaks from 80% to 40% with a constant tip break of 90%. It can be seen that decreasing the hub break location decreases the lift available from the hub region which results in higher RPMs to achieve the desired design example of 2.5 lbf thrust for this experiment. The higher RPMs also results in slightly higher mechanical power requirements as well. The baseline GM-15 propeller produces thrust over the entire propeller blade at the design AOA of 3.5 degrees which results in the lowest RPM and the lowest mechanical power required. The stock commercial propeller has one of the highest RPM values which translates to the highest mechanical power required. Thus, the 50_90 propeller is approximately 5.2% lower in mechanical power required for the stock propeller. The 50_90 propeller is also approximately 2.1% higher in mechanical power required for the baseline propeller.

Figure 16B:
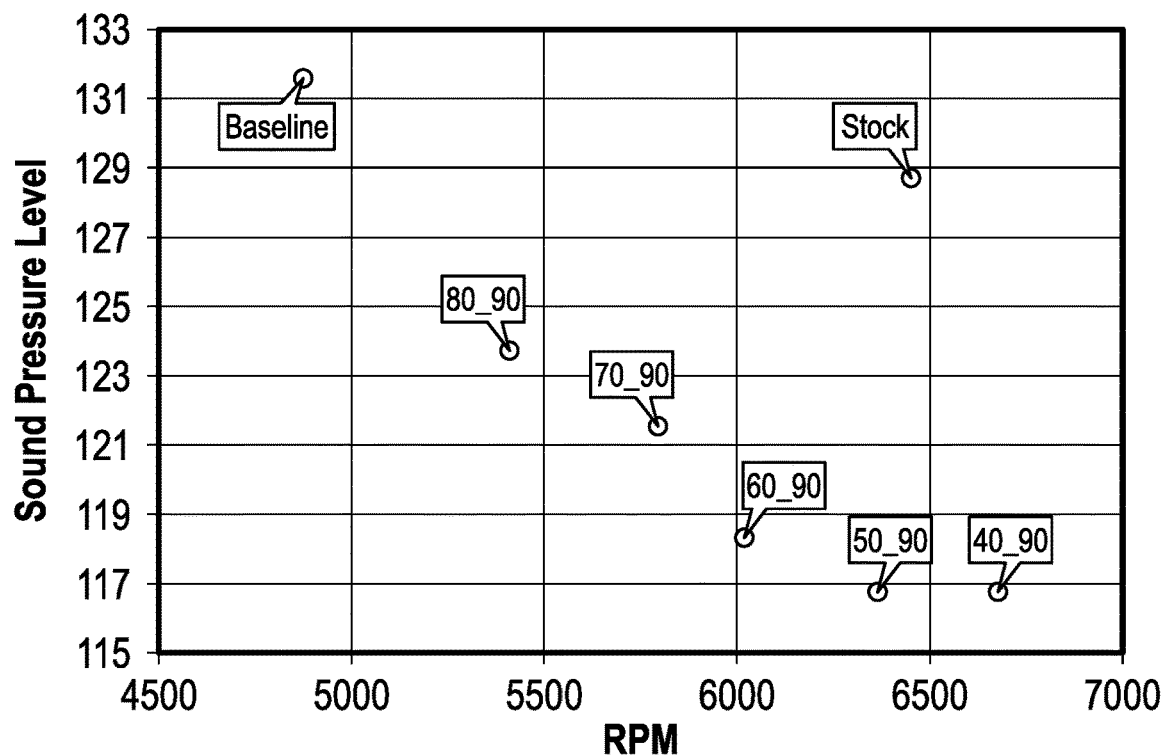
FIG. 16B is an illustrative graph of SPL for hub breaks from 80% to 40% with a constant tip break of 90%.
Figure 16C:
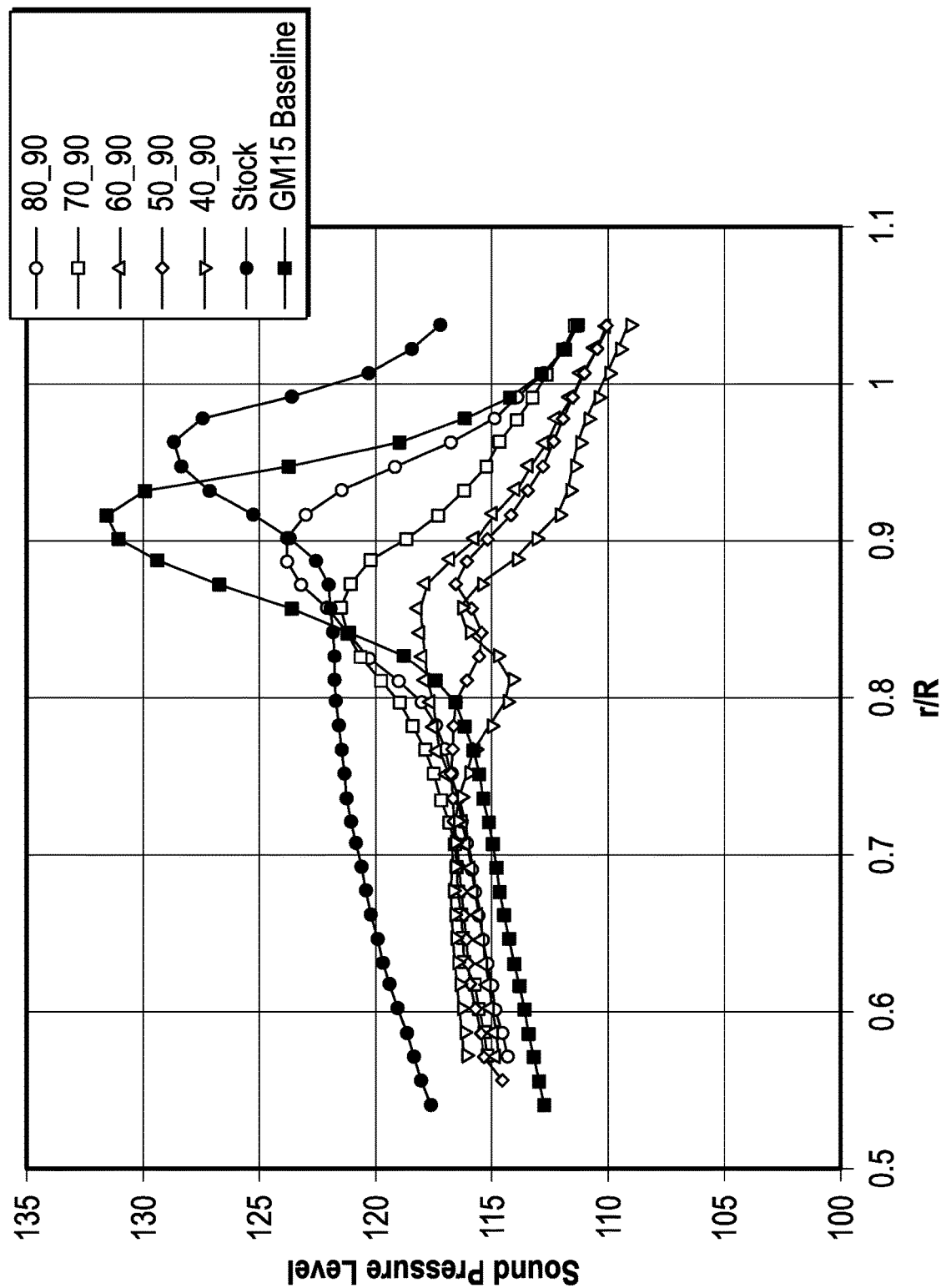
FIG. 16C is another illustrative graph of SPL for hub breaks from 80% to 40% with a constant tip break of 90%.

FIG. 16B is an illustrative graph of SPL for hub breaks from 80% to 40% with a constant tip break of 90%. FIG. 16C is another illustrative graph of SPL for hub breaks from 80% to 40% with a constant tip break of 90%. The lower the hub break, which moves the loaded portion of the blade further from the tip, the lower the SPL which levels off with 50% and 40% r/R. Despite having the lowest RPM and lower mechanical power required, the baseline propeller is the noisiest propeller. The stock propeller has only slightly less SPL than the baseline. Thus, it is possible to reduce the peak SPL almost 15 dBA by the 50_90 break propeller compared to the baseline propeller. The trends observed are similar for hub breaks with different constant tip breaks.

In this experiment, the effects of the tip breaks on various hub breaks was also studied. A range of tip breaks were studied depending on the extent of the hub breaks. Tip breaks ranged from 97% to 77% r/R from the hub depending on the hub break. A plot of the tip breaks versus both mechanical power and SPL are shown in FIGS. 16D and 16E, described below.

Figure 16D:
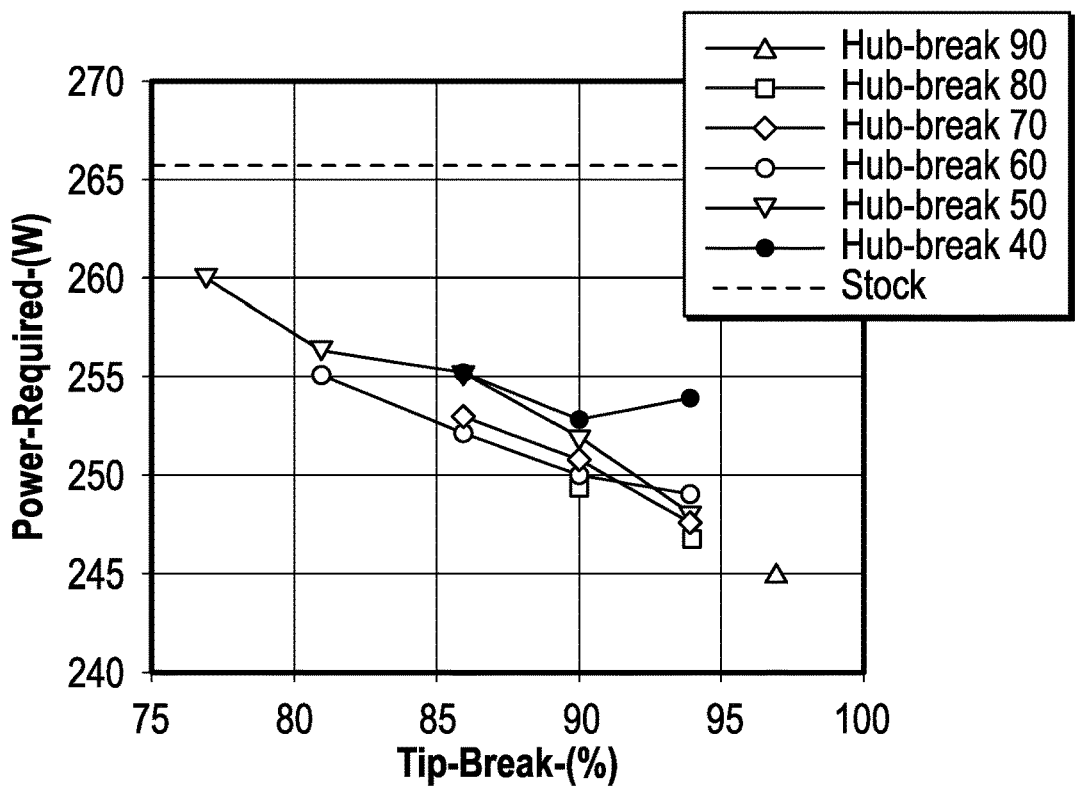
FIG. 16D is an illustrative graph of mechanical power required versus tip break (%) for tested hub breaks.

FIG. 16D is an illustrative graph of mechanical power required versus tip break (%) for tested hub breaks. For all hub breaks tested, moving the tip break towards the tip resulted in a lower mechanical power required, because more of a break at the tip reduces the thrust produced requiring a higher RPM. The trend is consistent for all hub breaks tested.

Figure 16E:
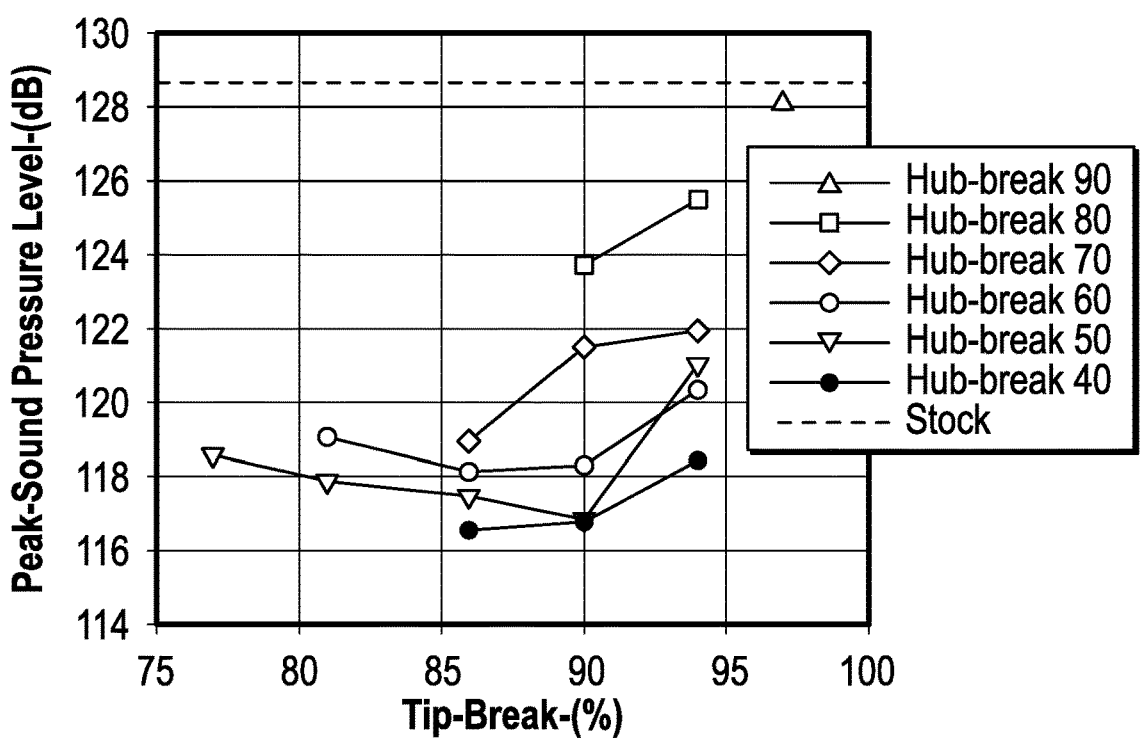
FIG. 16E an illustrative graph for peak SPL versus tip break (%) for tested hub breaks.

FIG. 16E an illustrative graph for peak SPL versus tip break (%) for tested hub breaks. Decreasing the hub break lowers the SPL for the tip breaks tested. Of the combinations tested, the 50_90 propeller seemed to have the lowest SPL where this was a minimum for the tested series. As such the 50_90 configuration was chosen as the best propeller, given the lowest SPL. The mechanical power is consistent with other propellers tested, only 4 watts more than the next smallest tip break.

Figure 17:
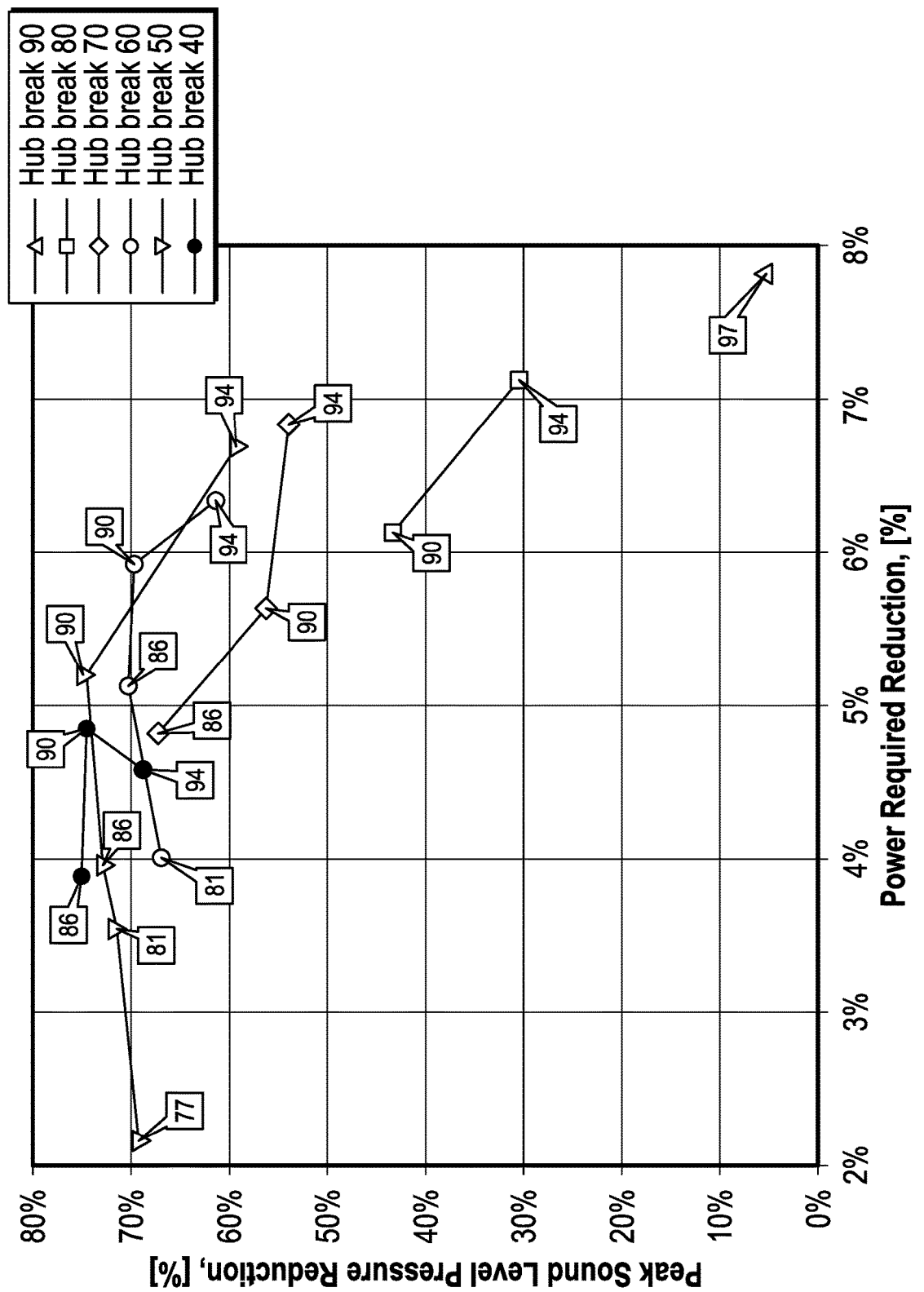
FIG. 17 is an illustrative graph of peak sound pressure reduction as a function of reduction in power required compared to a stock propeller.

FIG. 17 is an illustrative graph of peak sound pressure reduction as a function of reduction in power required compared to a stock propeller. In order to determine an illustrative best propeller design from the test data of the tested embodiment as a nonlimiting example in terms of SPL and power required, the data was analyzed to compare the decrease in perceived sound and decrease in power compared to the stock propeller. To do this, the SPL equation below was rearranged to solve for the acoustic pressure, p, for each propeller and compared to the acoustic pressure attained for the stock propeller at the cruise conditions.

$$SPL = 20\log_{10}\left(\frac{p}{p_{ref}}\right) \text{ dB}$$

where $p_{ref}$=20 µPa. This equation indicates that a 6 dB reduction in SPL corresponds a 50% decrease in acoustic pressure. FIG. 17 shows a summary of the measured peak sound pressure level reduction as a function of reduction in power required compared to the stock propeller while generating T=2.5 lbf at V=44 ft/s. This test series shows that the power required is primarily a result of tip break point. Propellers with higher tip break points are operating closer to the optimal lift to drag ratio over more of the span of the blade lowering the power required. The peak SPL is also shown to decrease as the hub break point decreases with small variations as tip break point increases. Previous investigations showed that reduction in SPL was directly correlated with lower rotational speed. Here it is shown that SPL is also related the amount of loading near the tip. Since less loading at the tip typically requires a higher rotational speed to generate the same amount of thrust there is a balance between these two effects creating optimal tip break points for maximum SPL reduction. This complex relationship between tip loading and rotational speed makes it difficult to predict the SPL reduction trends.

For illustrative purposes of selection criteria of propeller design, the criteria can be expressed as one with the highest percent sound reduction and highest percent efficiency increase. Based on these criteria, the 50% hub break point, 90% tip break point propeller was determined to be the most optimal design of the propellers tested with a reduction in perceived sound of 74.6% and an increase in overall efficiency of 5.2%. The propeller with the 90% hub break point and 97% tip break point had the largest increase in overall efficiency of 7.8%, but it only had a sound reduction of 6%. Any increases in efficiency compared to the 50% hub break point, 90% tip break point propeller resulted in an even larger decrease in percent sound reduction. This is because the reduction in the strength of tip vortices has a larger effect on SPL than it does on the amount of drag the motor must overcome. Due to the efficiency compared to SPL reduction, with an equal weighting of efficiency and SPL, the 50% hub break point, 90% tip break point propeller was chosen as the best propeller tested.

In summary, the goal of this experiment was to develop a propeller design approach that decreases sound pressure level, while also decreasing the power required. The designed propellers with varying hub and tip angle of attack break points provided both of these improvements. The power reductions ranged from about 2% to almost 8% with decreases in SPL ranging from 5 to 75% as compared to a stock propeller at the same operating conditions. These performance increases are likely due to the reduced induced drag resulting from the decreased strength of the tip vortices created by unloading the tip of the propeller. These improvements can allow UASs to operate longer with less noise and hasten acceptance of Urban Air Mobility vehicles in populated areas.

Experiment 2]

This experiment focused on the angle of attack (AOA) effects on mechanical power required to attain desired design performance, and noise level at thrust power levels and at RPM. The experiment compared the various embodiments of the double-break design of the invention. The design point for this experiment, as in others discussed herein, is 2.5 lbf of thrust, a freestream velocity of 44 ft/s, and an altitude of 7,000 ft as well as a constant chord propeller configuration of 1.87 inches, a propeller diameter of 13.3 inches, and an oval shaped tip. All airfoil aerodynamic data are reported for a Reynolds number of 100,000 as found in XFOIL.

The double-break design for minimum induced drag results in a propeller that is both quieter and more aerodynamically efficient than the stock commercial propeller and the baseline BEMT. In an advantageous example, the double-break propeller design incorporated a constant angle of attack (AOA) from the hub to an r/R of 50% where the section propeller thrust loading then dropped to zero lift at an r/R of 90% for a 50_90 configuration, as discussed above.

Propellers were designed using four different airfoils: GM-15, GOE 225, GOE 358, and the S1223.

For a 50_90 GM-15 propeller with the same design point conditions discussed above, it was desired to examine the influence of both the hub AOA and the tip AOA. For the GM-15 propeller, the hub AOA of 3.5 degrees was determined to be the optimum design for this break combination. As shown in FIG. 8A, this AOA is on the $c_l/c_d$ curve where the curve begins to turn for the maximum $c_l/c_d$ level part of the curve. Another possible design point would be the middle of the level part of the curve ion FIG. 8A at 5.5 degrees AOA. Thus, AOAs of 3.5, 4.5, and 5.5 were tested in this experiment. The tip AOA will also influence propeller performance, especially the generation of the tip vortex. A zero lift condition at the tip corresponded an AOA of −2.72 degrees. The tested range of tip conditions were −2.22, −2.72 and, −3.22 degrees AOA representing the zero lift AOA+/−0.5 degrees.

Figure 18:
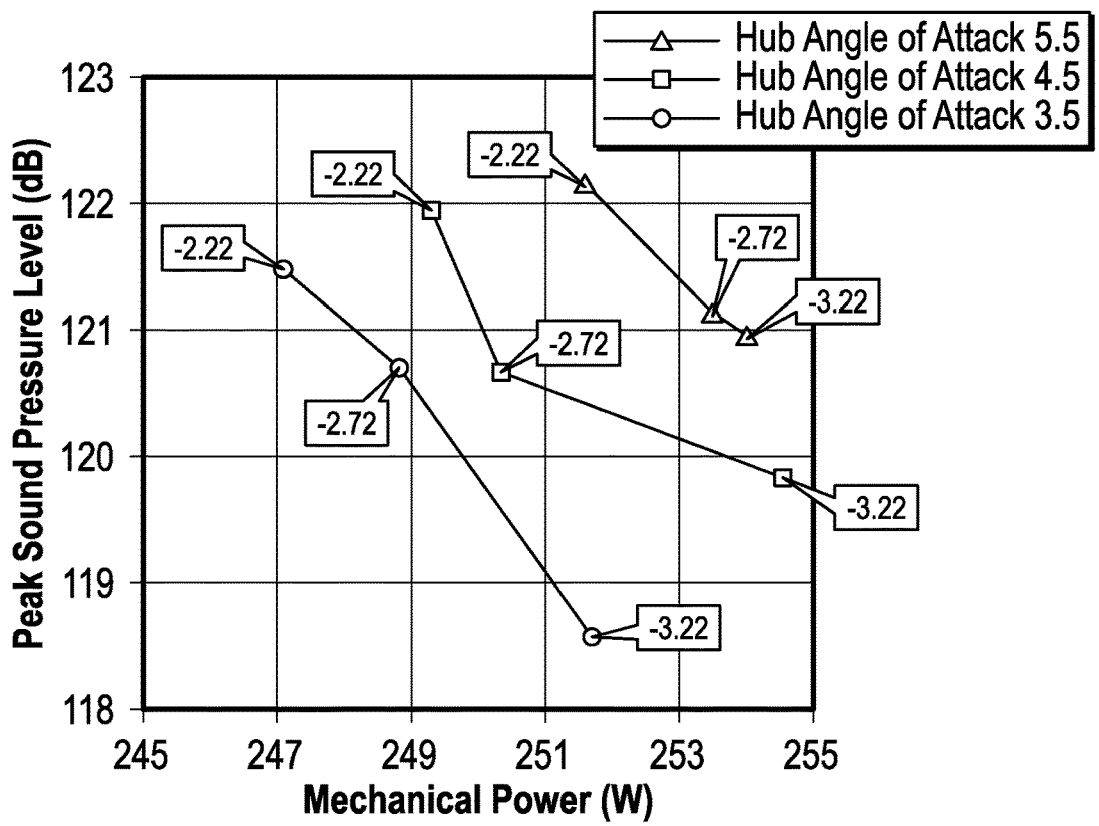
FIG. 18 is a graph for a GM-15 design propeller illustrating peak SPL as a function of mechanical power for −2.22, −2.72 and −3.22 tip AOAs for all hub AOAs tested.

Results for the GM-15 propeller variations are shown in FIGS. 18-21. FIG. 18 is a graph for a GM-15 design propeller illustrating peak SPL as a function of mechanical power for −2.22, −2.72 and −3.22 tip AOAs for all hub AOAs tested. The graph shows that increasing the hub AOA gives the general trend that a higher AOA gives a higher peak SPL and more mechanical power is required. A more negative tip AOA results in a lower SPL value and a higher mechanical power required as well.

Figure 19:
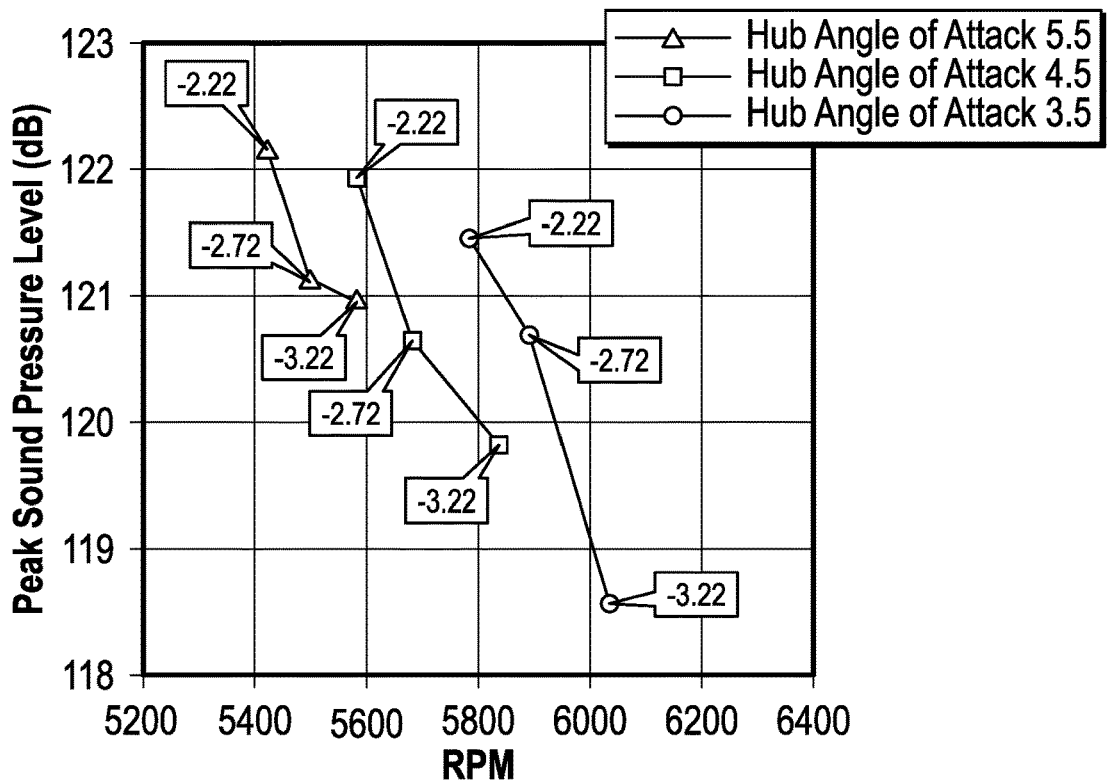
FIG. 19 is a graph for a GM-15 design propeller illustrating Peak SPL as a function of RPM for −2.22 and −3.22 tip AOAs for the hub AOAs tested.

FIG. 19 is a graph for a GM-15 design propeller illustrating Peak SPL as a function of RPM for −2.22 and −3.22 tip AOAs for the hub AOAs tested. The graph shows that a lower hub AOA results in a higher RPM. If the hub has a lower AOA, with its corresponding lower $c_l$ value, it requires more RPM to achieve the desired thrust. For the tip AOAs tested, the −3.22 value (that is slightly more negative than a zero lift AOA) results in the lowest peak SPL for a given hub AOA. This result would indicate that a slightly more negative tip AOA than the zero lift AOA results in more effectively reducing the tip vortex, thus lowering the SPL. The stock commercial propeller has a peak SPL of a 128.7 dBA. The lowest peak SPL for a hub AOA of 3.5 degrees and a tip AOA of −3.22 is 118.6 dBA, which is 10.1 dBA lower than the stock propeller.

Figure 20:
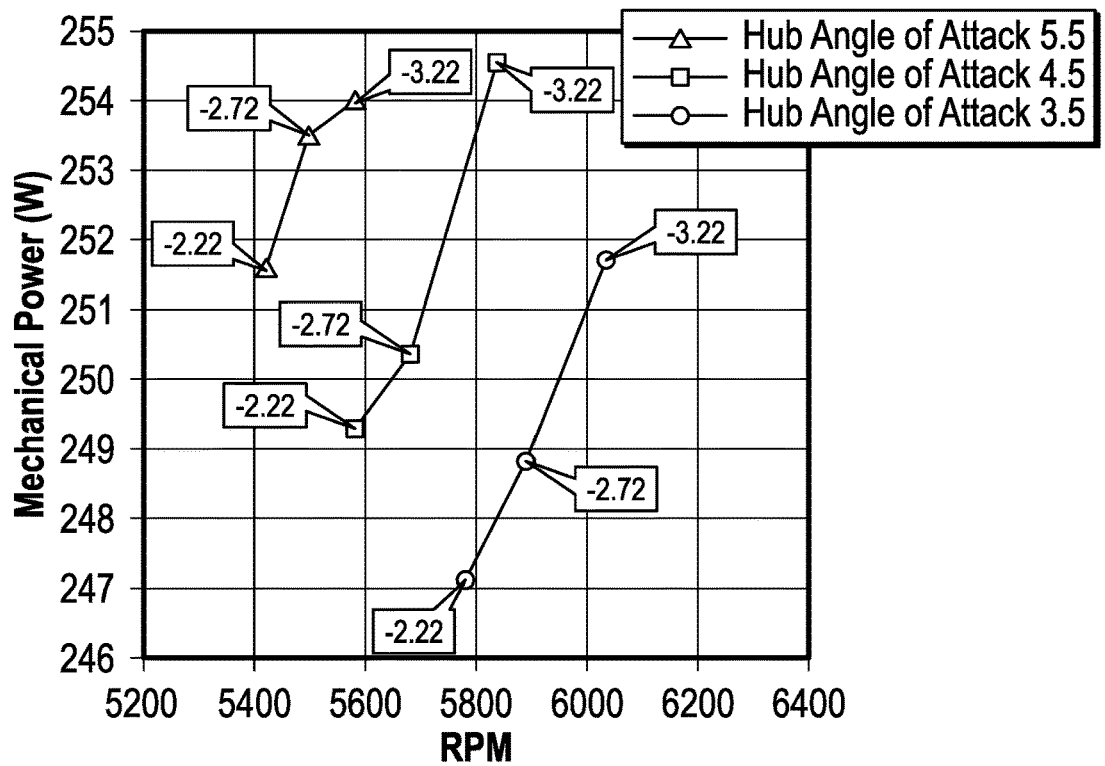
FIG. 20 is a graph for a GM-15 design propeller illustrating mechanical power as a function of RPM for −2.22, −2.72, and −3.22 tip AOAs for all hub AOAs tested.

FIG. 20 is a graph for a GM-15 design propeller illustrating mechanical power as a function of RPM for −2.22, −2.72, and −3.22 tip AOAs for all hub AOAs tested. The graph shows that decreasing the tip AOA (more negative) results in an increase in mechanical power and RPM. From these tests, if a low SPL is desired then one can use a hub AOA on the $c_l/c_d$ curve preferably where it begins to break to a level or flat top. For the GM-15 propeller, that value is 3.5 degrees. In addition, to keep the SPL low, a tip AOA slightly more negative than zero lift is desired. In these tests, −3.22 degrees gave the lowest value. Further tests showed that an AOA that is more negative than −3.22 degrees resulted in an increase in SPL.

Figure 21:
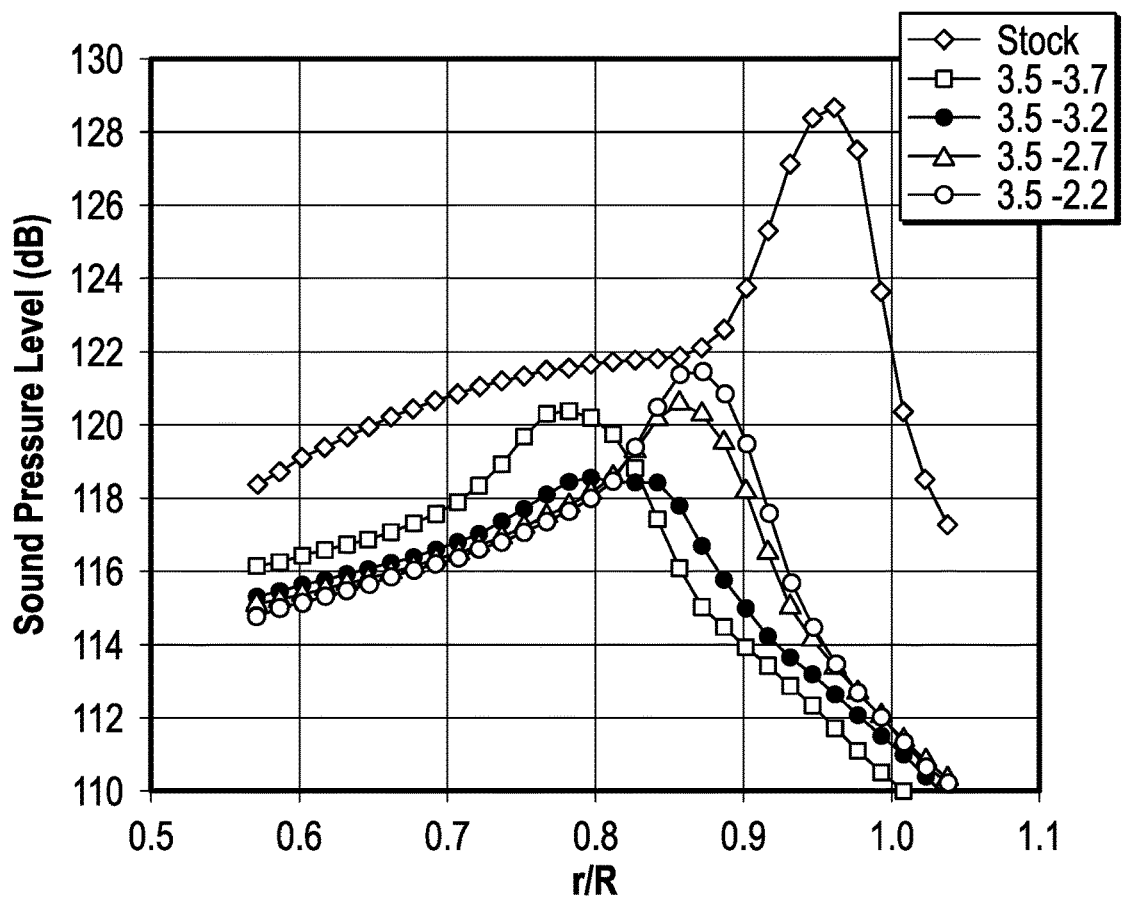
FIG. 21 is a graph for a GM-15 design propeller illustrating SPL as a function of radial distance along the blade as measured traverse one inch behind a 50_90 propeller with a hub AOA of 3.5 degrees.

FIG. 21 is a graph for a GM-15 design propeller illustrating SPL as a function of radial distance along the blade as measured traverse one inch behind a 50_90 propeller with a hub AOA of 3.5 degrees. The graph shows that the lowest SPL value is for −3.22 degrees, and a more negative AOA results in a higher SPL value.

In summary, for the GM-15 study, the hub AOA was varied from 3.5 to 6.5 degrees for a constant zero thrust loading tip angle of attack of −2.7 degrees. The tip angle of attack is then varied from −3.2 degrees to −2.2 degrees for each of the hub angles of attack. The −2.2 degrees tip angle of attack does have the lowest thrust power for each of the hub angles of attack. However, if a lower sound pressure level is desired, then, for the lower hub angles of attack of 3.5 and 4.5 degrees, a tip angle of attack of −3.2 degrees should be used, resulting in a 7.8% reduction in SPL for 3.5 degrees AOA at the hub. As seen in the data, there exists a tradeoff between lower thrust power and lower SPL using various combinations of hub and tip AOAs.

Figure 22:
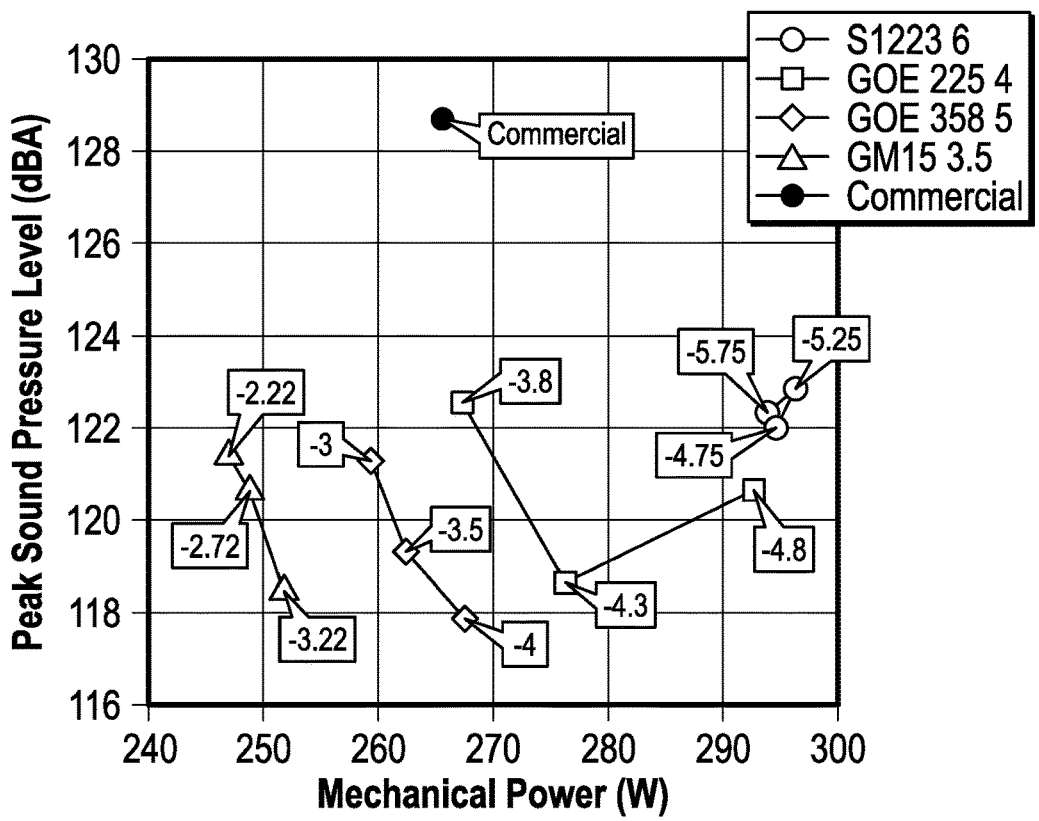
FIG. 22 is a graph for the tested airfoils illustrating peak SPL as a function of mechanical power for the maximum design hub AOAs for all tip AOAs.
Figure 23:
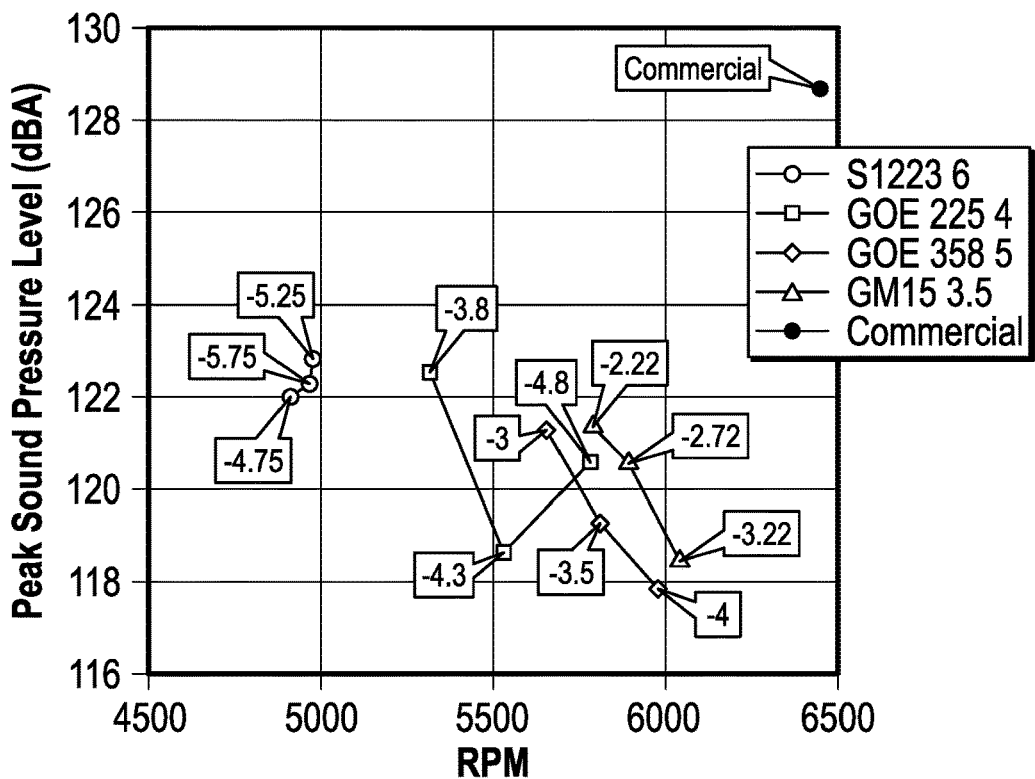
FIG. 23 is a graph for the tested airfoils illustrating peak SPL as a function of RPM for the $c_l/c_d$ maximum design hub AOAs for all tip AOAs.
Figure 24:
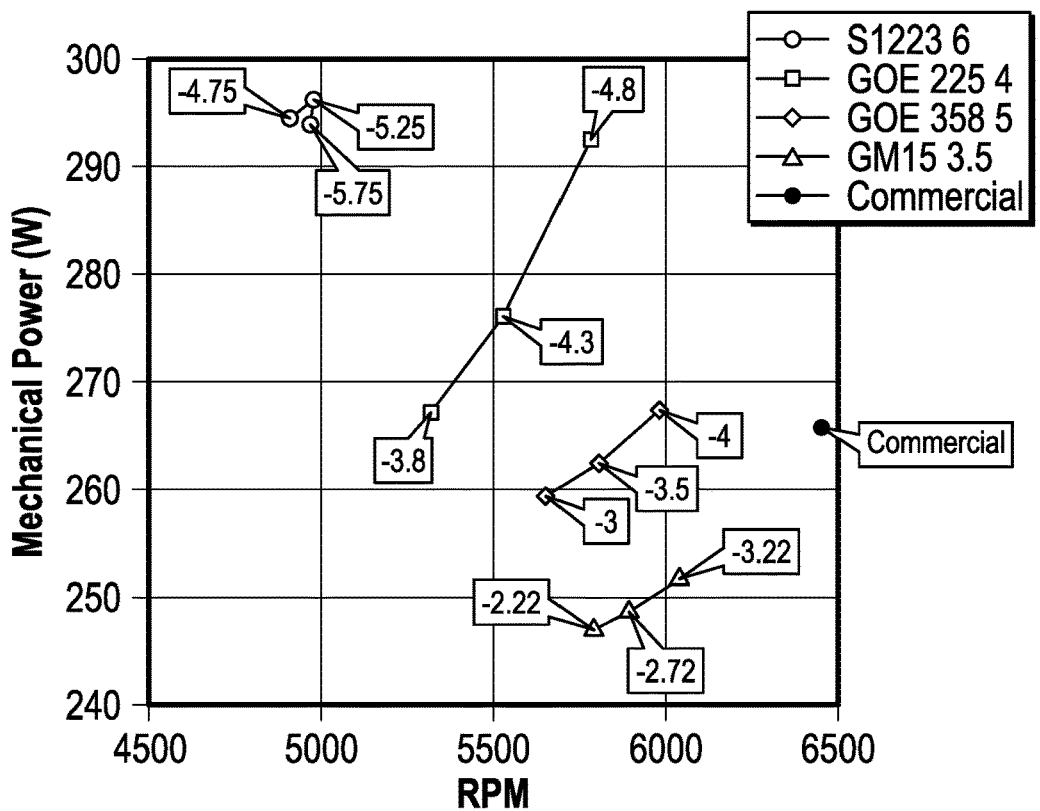
FIG. 24 is a graph for the tested airfoils illustrating mechanical power as a function of RPM for the $c_l/c_d$ maximum design hub AOAs for all tip AOAs.

FIGS. 22-24 show results of all the airfoils tested and includes data for the commercial, stock propeller. The four airfoil designs are GM-15, GOE 225, GOE 358, and the S1223. The tests used a tip AOA for the particular design that would result in a zero lift at the tip. For the GM-15 design, the tip AOA was −2.72 degrees. For the GOE 225 design, the tip AOA was −4.3 degrees. For the GOE 358 design, the tip AOA was −3.5 degrees. For the S1223 design, the tip AOA was −5.25 degrees. The Aeronaut CamCarbon 13×10 propeller was selected as the commercial stock propeller for comparison to the designed propellers. It has a diameter of 13.3 in, maximum chord length of one inch, and a scimitar shaped tip.

FIG. 22 is a graph for the tested airfoils illustrating peak SPL as a function of mechanical power for the maximum design hub AOAs for all tip AOAs. FIG. 23 is a graph for the tested airfoils illustrating peak SPL as a function of RPM for the $c_l/c_d$ maximum design hub AOAs for all tip AOAs. FIG. 24 is a graph for the tested airfoils illustrating mechanical power as a function of RPM for the $c_l\ c_d$ maximum design hub AOAs for all tip AOAs. All custom propellers tested had a lower peak SPL than the commercial propeller. The GM-15 and the GOE 358 propellers generally had lower mechanical power requirements as well. This group of plots holds the hub AOA constant at the design AOA and varies the tip AOA over the zero lift AOA+/−0.5 degrees. The GOE 358 behaves similarly to the GM-15. However, it has a lower $c_l/c_d$ max value and has higher drag values over the range of operation leading to a higher mechanical power required. The GOE 225 has a higher drag value which causes higher mechanical power. The S1223 has the highest drag values which result in the highest mechanical power required. The drag coefficient much higher at the design AOA than the other airfoils. The result is that there is not much difference in performance for the tip AOAs tested. In general, peak SPL decreases as the tip AOA becomes more negative for both the GM-15 and the GOE 358. For the GOE 225, reducing the tip AOA more than the zero lift AOA (making it more negative) is counterproductive and increases the peak SPL as well. For the S1223, there is not much difference in peak SPL. The plots of peak SPL and mechanical power vs RPM also show similar trends. The GM-15, while a higher RPM than the other propellers (lowest lift coefficient values), does have the lowest mechanical power. The lowest peak SPL value goes to the GOE 358. In general, as seen with the GM-15, a lower (more negative) tip AOA results in a lower peak SPL, especially for the airfoils with a reasonably suitable $c_l/c_d$ curve with low drag. Using the tip AOA of zero lift is an acceptable selection however some additional performance might be available with a slightly more negative AOA than the zero lift AOA at the tip. This will result in slightly more mechanical power required.

Figure 25:
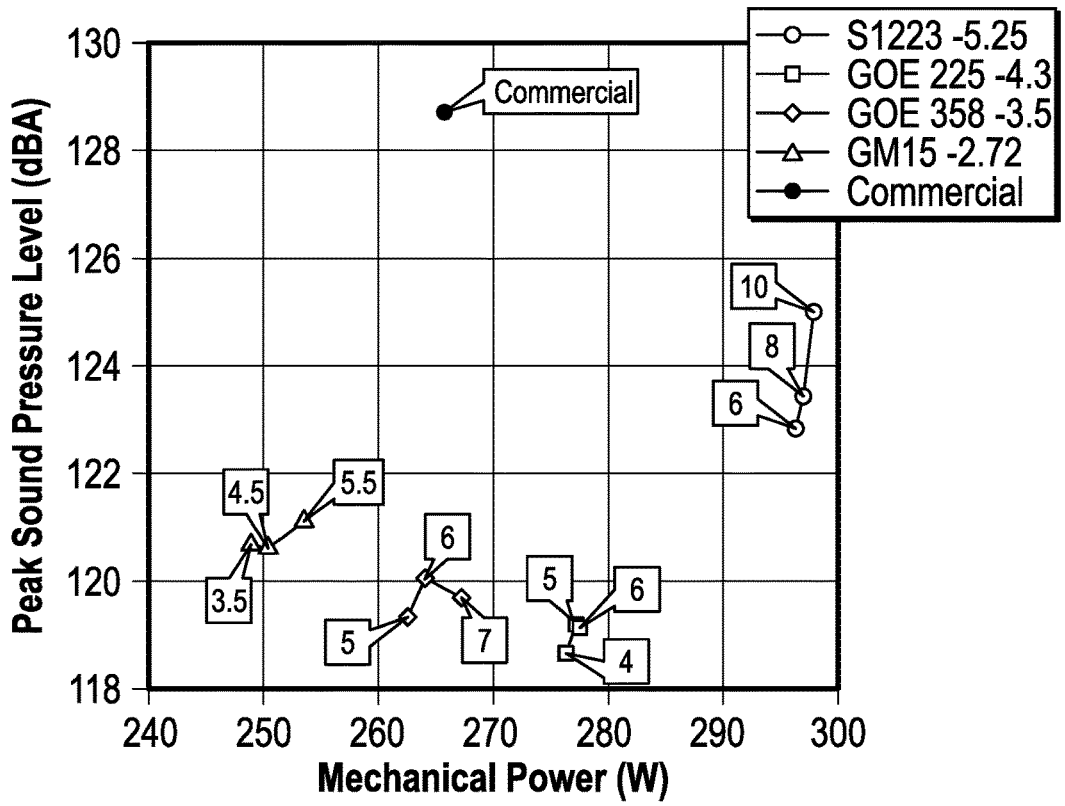
FIG. 25 is a graph for the tested airfoils illustrating peak SPL as a function of mechanical power for the zero lift tip AOAs for all $c_l/c_d$ hub AOAs.
Figure 26:
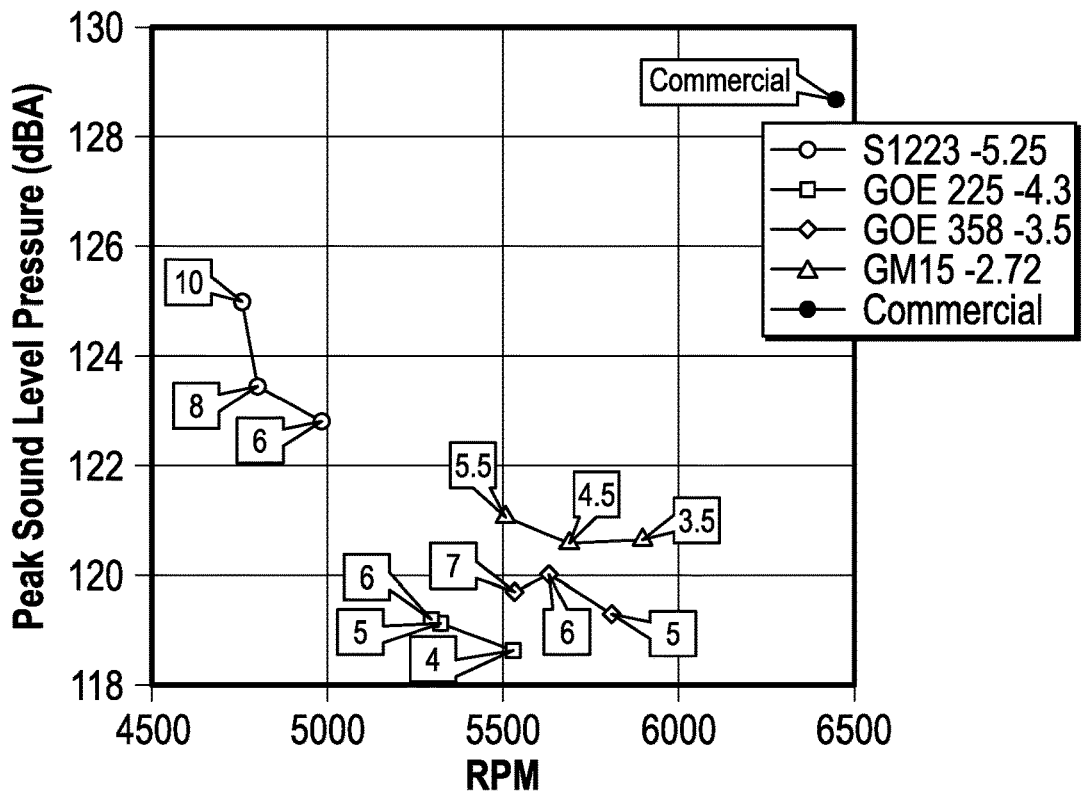
FIG. 26 is a graph for the tested airfoils illustrating peak SPL as a function of RPM for the zero lift tip AOAs for all $c_l/c_d$ hub AOAs.
Figure 27:
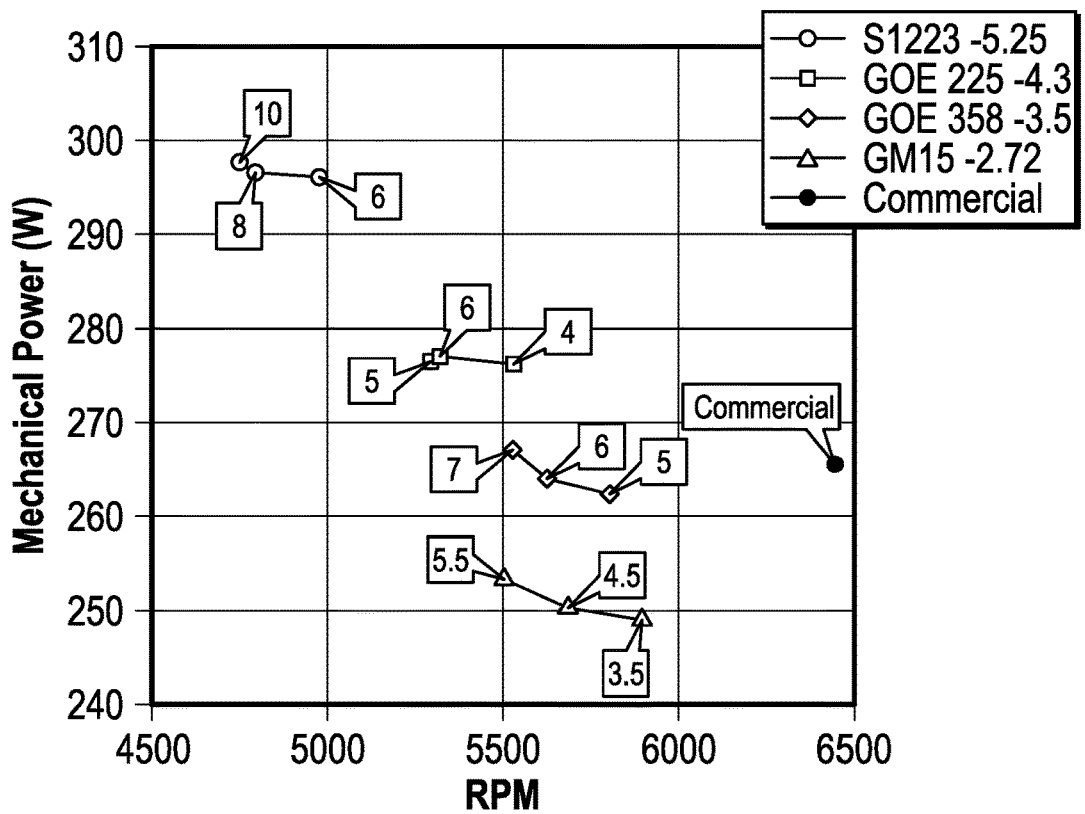
FIG. 27 is a graph for the tested airfoils illustrating mechanical power as a function of RPM for the zero lift tip AOAs for all $c_l/c_d$ hub AOAs.

FIG. 25 is a graph for the tested airfoils illustrating peak SPL as a function of mechanical power for the zero lift tip AOAs for all $c_l/c_d$ hub AOAs. FIG. 26 is a graph for the tested airfoils illustrating peak SPL as a function of RPM for the zero lift tip AOAs for all $c_l/c_d$ hub AOAs. FIG. 27 is a graph for the tested airfoils illustrating mechanical power as a function of RPM for the zero lift tip AOAs for all $c_l/c_d$ hub AOAs. In these figures, the zero lift AOA is constant for the airfoils and the hub AOA varies over the range tested. The trends show that the design hub AOAs (lowest AOA tested for each propeller) results in the lowest peak SPL and the lowest mechanical power. The trend reinforces that the chosen AOA where the $c_l/c_d$ curve breaks to the maximum value is an advantageous design point. Using this hub AOA also results in the highest RPM for the range of hub AOAs tested for each propeller.

Experiment 3

Unloading the selected tip zone reduces the torque required to spin the propeller which leads to a reduction in mechanical power consumption. Comparisons of the mechanical power can be made to recommend the optimum propeller chord and RPM for design.

Figure 28A:
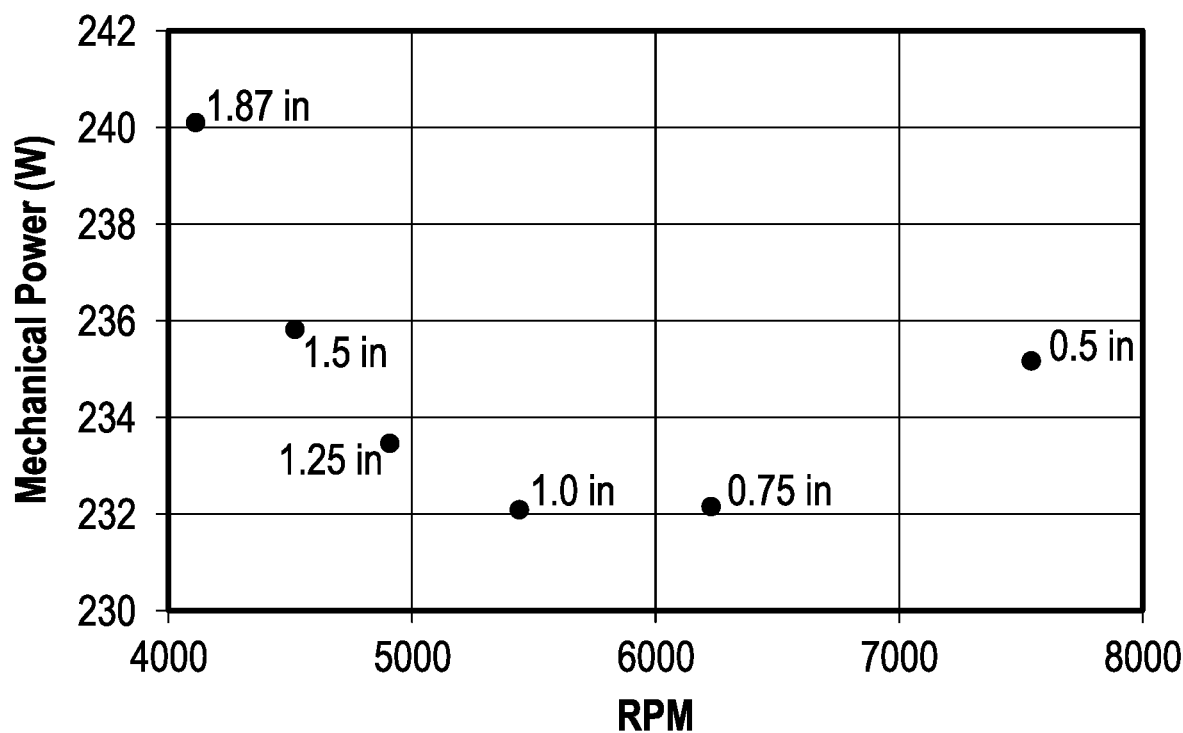
FIG. 28A is an illustrative graph showing mechanical power as a function of RPMs for a given propeller design with different chord lengths for minimum power loss, according to the teachings herein.
Figure 28B:
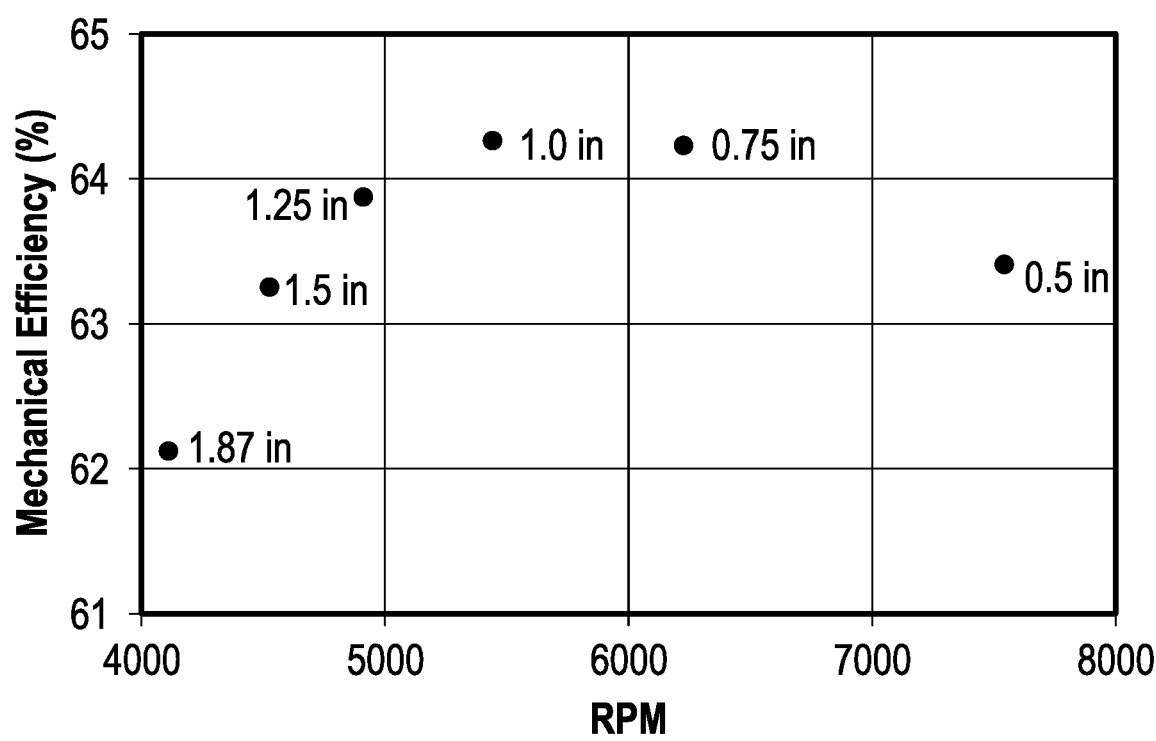
FIG. 28B is an illustrative graph showing efficiency as a function of RPMs for a given propeller design with different chord lengths for minimum power loss, according to the teachings herein.

FIG. 28A is an illustrative graph showing mechanical power as a function of RPMs for a given propeller design with different chord lengths for minimum power loss, according to the teachings herein. FIG. 28B is an illustrative graph showing efficiency as a function of RPMs for a given propeller design with different chord lengths for minimum power loss, according to the teachings herein. In FIGS. 28A and 28B, RPM and chord were allowed to change for a given propeller design with the desire to find the optimal chord length to minimize thrust power loss and maximize efficiency or some combination thereof. In the nonlimiting example, a one inch chord for the particular blade design would appear to be good selection.

Other and further embodiments utilizing one or more aspects of the inventions described above can be devised without departing from the disclosed invention as defined in the claims. For example, other embodiments can include other various pitch angles, changes in pitch angles along the propeller length, tip shapes, overall propeller shapes, and other variations than those specifically disclosed herein within the scope of the claims, including the discussions and variations in the Appendices, which are incorporated herein by reference.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope of the following claims.

What is claimed is:

1. A propeller blade configured to be coupled to a hub of a propeller, the blade having a blade length from a center of the hub to a blade tip at a distal end of the blade from the hub, comprising:
   a loaded zone configured to produce lift; and
   an unloaded tip zone having a nonzero length of at least 3% of the blade length and configured to produce a zero or less lift coefficient for the unloaded tip zone;
   wherein a lift coefficient of the propeller blade has a positive value in the loaded zone and changes starting at a first location along the blade length to an increasingly negative slope relative to an increasing distance along the blade length and changes to an increasingly positive slope at a second location at a greater distance along the blade length than the first location to produce a non-positive lift coefficient for the unloaded tip zone.

2. The propeller blade of claim 1, wherein a lift coefficient of the propeller blade reduces in value starting at a first location along the blade length and continues reducing until the unloaded tip zone.

3. The propeller blade of claim 1, wherein the unloaded tip zone is configured to reduce vortex flow generated at the tip of the blade during operation of the blade.

4. The propeller blade of claim 1, wherein the unloaded tip zone has a length of less than 45% of the blade length.

* * * * *